(12) United States Patent
Chang et al.

(10) Patent No.: US 8,510,571 B1
(45) Date of Patent: Aug. 13, 2013

(54) SYSTEM AND METHOD FOR INSERTING SECURITY MECHANISMS INTO A SOFTWARE PROGRAM

(76) Inventors: Hoi Chang, Pleasanton, CA (US); Florian Kerschbaum, San Francisco, CA (US); Kyle Faulkner, Orinda, CA (US); David M'Raïhi, San Carlos, CA (US); Michael Joseph Mehlberg, Lafayette, IN (US)

( * ) Notice: Subject to any disclaimer, the term of this patent is extended or adjusted under 35 U.S.C. 154(b) by 2531 days.

(21) Appl. No.: 10/809,155

(22) Filed: Mar. 24, 2004

Related U.S. Application Data

(60) Provisional application No. 60/457,551, filed on Mar. 24, 2003.

(51) Int. Cl.
*G06F 12/14* (2006.01)

(52) U.S. Cl.
USPC ........... 713/191; 713/187; 713/188; 713/190; 726/22; 726/23; 726/24; 726/26

(58) Field of Classification Search
USPC ........................................................ 713/191
See application file for complete search history.

(56) References Cited

U.S. PATENT DOCUMENTS

| | | | |
|---|---|---|---|
| 4,120,030 A | 10/1978 | Johnstone | |
| 4,465,901 A | 8/1984 | Best | |
| 5,493,649 A | 2/1996 | Slivka et al. | |
| 5,535,188 A | * 7/1996 | Dang et al. | ................. 369/53.21 |
| 5,666,411 A | 9/1997 | McCarty | |
| 5,684,875 A | 11/1997 | Ellenberger | |
| 5,687,191 A | 11/1997 | Lee et al. | |
| 5,737,416 A | 4/1998 | Cooper et al. | |
| 5,745,573 A | 4/1998 | Lipner et al. | |
| 5,822,360 A | 10/1998 | Lee et al. | |
| 5,822,517 A | 10/1998 | Dotan | |
| 5,892,899 A | 4/1999 | Aucsmith et al. | |
| 5,892,900 A | 4/1999 | Ginter et al. | |
| 5,933,498 A | 8/1999 | Schneck et al. | |

(Continued)

FOREIGN PATENT DOCUMENTS

| | | |
|---|---|---|
| WO | WO 97/15051 | 4/1997 |
| WO | WO 99/01815 | 1/1999 |

(Continued)

OTHER PUBLICATIONS copy protection methods.*

(Continued)

*Primary Examiner* — Kambiz Zand
*Assistant Examiner* — Yonas Bayou
(74) *Attorney, Agent, or Firm* — Anthony P. Filomena, Esq; Taft, Stettinius & Hollister LLP

(57) ABSTRACT

A system and method for protecting a software program from unauthorized modification or exploitation. A software security mechanism according to the present invention is difficult for a hacker or cracker to detect and/or defeat, but does not impose excessive runtime overhead on the host software program. The present invention further comprises a system and method for automating the injection of a software security mechanism according to the present invention into a host software program.

21 Claims, 13 Drawing Sheets

(56) References Cited

U.S. PATENT DOCUMENTS

| | | | |
|---|---|---|---|
| 6,006,328 | A | 12/1999 | Drake |
| 6,009,525 | A * | 12/1999 | Horstmann ............ 726/22 |
| 6,044,469 | A | 3/2000 | Horstmann |
| 6,052,780 | A | 4/2000 | Glover |
| 6,055,503 | A | 4/2000 | Horstmann |
| 6,061,449 | A | 5/2000 | Candelore et al. |
| 6,088,452 | A | 7/2000 | Johnson et al. |
| 6,119,108 | A | 9/2000 | Holmes et al. |
| 6,134,659 | A | 10/2000 | Sprong et al. |
| 6,138,119 | A | 10/2000 | Hall et al. |
| 6,175,925 | B1 | 1/2001 | Nardone et al. |
| 6,178,509 | B1 | 1/2001 | Nardone et al. |
| 6,185,683 | B1 | 2/2001 | Ginter et al. |
| 6,192,475 | B1 | 2/2001 | Wallace |
| 6,205,550 | B1 | 3/2001 | Nardone et al. |
| 6,237,786 | B1 | 5/2001 | Ginter et al. |
| 6,334,189 | B1 | 12/2001 | Granger et al. |
| 6,438,432 | B1 | 8/2002 | Zimmermann et al. |
| 6,463,538 | B1 | 10/2002 | Elteto |
| 6,480,959 | B1 | 11/2002 | Granger et al. |
| 6,724,554 | B1 * | 4/2004 | Braithwaite et al. ............ 360/60 |
| 6,757,587 | B1 * | 6/2004 | English et al. ............ 700/245 |
| 7,058,822 | B2 * | 6/2006 | Edery et al. ............ 726/22 |
| 7,080,257 | B1 * | 7/2006 | Jakubowski et al. ......... 713/187 |
| 7,171,693 | B2 * | 1/2007 | Tucker et al. ............ 726/26 |
| 7,287,166 | B1 * | 10/2007 | Chang et al. ............ 713/187 |
| 7,334,264 | B2 * | 2/2008 | Takahashi ............ 726/24 |
| 7,430,670 | B1 * | 9/2008 | Horning et al. ............ 713/190 |
| 2002/0178375 | A1 * | 11/2002 | Whittaker et al. ............ 713/200 |
| 2003/0172293 | A1 * | 9/2003 | Johnson et al. ............ 713/200 |
| 2004/0073800 | A1 * | 4/2004 | Shah et al. ............ 713/176 |
| 2004/0153661 | A1 * | 8/2004 | Graunke ............ 713/200 |

FOREIGN PATENT DOCUMENTS

| | | |
|---|---|---|
| WO | WO 99/64973 | 12/1999 |
| WO | WO 00/67095 | 11/2000 |
| WO | WO 00/77596 | 12/2000 |
| WO | WO 01/14953 | 3/2001 |
| WO | WO 01/79969 | 10/2001 |
| WO | WO 02/46890 | 6/2002 |
| WO | WO 02/095546 | 11/2002 |
| WO | WO 02/101519 | 12/2002 |

OTHER PUBLICATIONS

Cifuentes, Cristina, Structuring Decompiled Graphs, Proceedings of the International Conference on Computer. Construction, pp. 91-105, Linkoping, Sweden, 1996.
Joepgen, Hans-Georg, and Krau_, Stefan, Rundum-Schutz durch Fertig-Programmbausteine, Elektronik 17/1993, pp. 52-56.
Larus, James, Whole Program Paths, SIGPLAN PLDI, May 1999.
Schulman, Andrew, Examining the Windows AARD Detection Code, Dr. Dobb's Journal, vol. 18, No. 19, Sep. 1993, pp. 42, 44-8, 89.
White, Steve R., and Comerford, Liam, ABYSS: An Architecture for Software Protection, IEEE Transactions on Software Engineering, vol. 16, No. 6, Jun. 1990, pp. 619-629.
Aucsmith, Tamper Resistant Software: An Implementation from Lecture Notes in Computer Science 1174, 1996, pp. 317-333.
Millen, Kernel Isolation for the PDP-11/70 from Proceedings of the 1982 Symposium on Security and Privacy, 1982, pp. 57-65.
Dwork, Lotspiech and Naor, Digital Signets: Self-Enforcing Protection of Digital Information (Preliminary Version), 1996, pp. 489-498.
Wood and Seidler, Security Modules: Potent Information Security System Components from Computers & Security, 1985, pp. 114-121.
Necula and Lee, Research on Proof-Carrying Code for Untrusted-Code Security from 1997 IEEE Symposium on Security and Privacy, 1997, p. 204.
Sander and Tschudin, Protecting Mobil Agents Against Malicious Hosts from Lecture Notes in Computer Science 1419, Mobile Agents and Security, 1998, pp. 44-60.
Mambo, Murayama and Okamoto, A Tentative Approach to Constructing Tamper-Resistant Software from New Security Paradigms Workshop, 1997, pp. 23-33.
Kahng, Mantik, Markov, Potkonjak, Tucker, Wang and Wolfe, Robust IP Watermarking Methodologies for Physical Design from Design Automation Conference, 1998, pp. 782-787.
Carolina, Software Protection Technology Legal Aspects of Software Protection Devices from the Computer Law and Security Report, 1995, pp. 188-193.
Larus and Schnarr, EEL: Machine-Independent Executable Editing, 1995; pp. 1-10.
Collberg, Thomborson and Low, Manufacturing Cheap, Resilient, and Stealthy Opaque Constructs, 1998, pp. 184-196.
US 5,748,741, 05/1998, Johnson et al. (withdrawn)*

* cited by examiner

SYSTEM AND METHOD FOR INSERTING SECURITY MECHANISMS INTO A SOFTWARE PROGRAM

This application claims the benefit of U.S. Provisional Application No. 60/457,551, filed Mar. 24, 2003.

BACKGROUND

Software piracy is a recognized and growing problem. Software program vendors may experience losses of revenue due to unauthorized distribution of pirated copies of the vendor's software programs. Such copies otherwise would have been properly licensed by the software program vendor, at the vendor's then current licensing rates.

In addition to the loss of licensing revenue from the distribution of pirated copies of a software program, software piracy also constitutes a threat to expose valuable trade secrets that may be embodied in a particular software program. A software program may have significant value, and a software program vendor may achieve a significant competitive advantage, out of the software program vendor's trade secrets that are embodied in the software program. When such trade secrets lose their confidentiality, the software program's value is diminished, and the software program vendor's competitive advantage is undermined.

A contributing cause to the software piracy problem is the fact that software programs consist of electronic files that usually must be arranged according to certain specifications for proper operation with known microprocessors and operating systems. Thus, such electronic files are vulnerable to modification by malicious users, known as "hackers" or "crackers." Many software security mechanisms have evolved in an attempt to hinder the ability of hackers or crackers to overcome a software program vendor's license restrictions or to expose a software program vendor's trade secrets. However, such software security mechanisms often are too easily breached by a skilled hacker or cracker, or impose excessive runtime "overhead" on the software program. Thus, the software security industry has yet to develop a satisfactory mechanism or set of mechanisms to overcome the problem of software piracy.

For the foregoing reasons, it is desired to provide a software security mechanism to protect a software program from unauthorized modification or exploitation. The desired software security mechanism should be difficult for a hacker or cracker to detect and/or defeat, but should not impose excessive runtime overhead on the software program. It is further desired to provide a technique for automating the injection of the desired software security mechanism into a previously developed software program.

SUMMARY

The present invention comprises a system and method for protecting a software program (called a "host software program") from unauthorized modification or exploitation. Embodiments of the present invention are adaptable to protect a host software program against reverse engineering, code lifting, unauthorized analysis and access, and the like. A software security mechanism according to the present invention is difficult for a hacker or cracker to detect and/or defeat, but does not impose excessive runtime overhead on the host software program. The present invention further comprises a system and method for automating the injection of a software security mechanism according to the present invention into a host software program.

In an embodiment, the present invention comprises a system for automating the installation of one or more software security mechanisms into a previously developed software program, the system comprising a computer having a memory; a first software program resident in the memory, the first software program having at least one predetermined functionality; a second software program resident in the memory, the second software program being operable to inject at least one guard into the first software program without disrupting the at least one predetermined functionality, the at least one guard comprising guard instructions that, when executed, are operable to deter tampering with the first software program; and a third software program resident in the memory, the third software program comprising program instructions, wherein the second software program operates to inject the at least one guard into the first software program in response to the program instructions of the third software program. In an aspect of this embodiment, the present invention is operable to generate an executable version of the first software program having the at least one guard injected therein, such that the guard instructions may be executed by running the executable version of the first software program. In an aspect of this embodiment, at least one of the at least one guards is configured, upon detection of unauthorized modification of the first software program, to take at least one defensive action during execution of an executable version of the first software program.

In an embodiment, the present invention comprises a method for increasing the tamper resistance of a software program through the use of at least one guard, wherein the at least one guard comprises guard instructions that are operable to deter tampering with the software program, the method comprising the steps of: defining a guard schema, the guard schema comprising a syntax for a guard script language; defining a guard script, the guard script comprising a protection scheme desired for the host software program; building a document object model using the guard script; and traversing the document object model. In an aspect of this embodiment, the step of defining a guard script comprises the steps of: inserting markers into a source code version of the host software program, the markers being arranged within the host software program according to the protection scheme desired for the host software program; and utilizing the markers in defining the guard script, the definition of the guard script being accomplished in a manner consistent with the guard schema. In an aspect of this embodiment, the step of building a document object model comprises the steps of: reading the guard schema; and parsing the guard script for consistency with the guard schema. In an aspect of this embodiment, the document object model comprises one or more nodes, and the step of traversing the document object model comprises the steps of detecting at least one of the one or more nodes of the document object model; and build a list of commands that when executed cause the injection of the guard instructions into the host software program.

In an embodiment, the present invention comprises a method for increasing the tamper resistance of a software program through the use of at least one guard, wherein the at least one guard comprises guard instructions that are operable to deter tampering with the first software program, the method comprising the steps of inserting markers into the host software program, the markers being arranged within the host software program according to a protection scheme desired for the host software program; defining a threat model for the host software program; defining constraints on size and performance of the host software program; and injecting guard instructions into the host software program in accordance with the markers, the threat model, and the constraints. In an aspect of this embodiment, the step of injecting guard instructions into the host software program comprises the steps of defining a guard script, the guard script being defined automatically through analysis of the markers, the threat model, and the constraints; building a document object model using the guard script; and traversing the document object model to build a list of commands that when executed cause the injection of the guard instructions into the host software program.

In an embodiment, the present invention comprises a method for updating a guard injection computer program, the guard injection computer program being operable to inject one or more guards into a host software program in response to one or more guard script commands, each of the one or more guards comprising guard instructions that are operable to deter tampering with the host software program, the method comprising the steps of reading one or more guard libraries and/or guard managers, the guard libraries and/or guard managers comprising computer files and computer instructions related to at least one of the one or more guards; obtaining a list of commands from a guard engine; deriving a guard script language specification schema from the guard engine, guard libraries, and/or guard managers, the guard script language specification schema comprising syntactical requirements for the guard script commands; and deriving documentation for the at least one of the one or more guards from the guard engine, guard libraries, and/or guard managers. In an aspect of this embodiment, the guard script language specification schema comprises an XML Schema Definition (XSD) format. In an aspect of this embodiment, the present invention further comprises the steps of deriving a guard symbol schema from the guard engine, guard libraries, and/or guard managers, the guard symbol schema being useable by the guard injection computer program in carrying out the guard script commands; and populating a graphical user interface of the guard injection computer program with functionality that is consistent with the guard script language specification schema and the guard symbol schema. In an aspect of this embodiment, the guard symbol schema comprise an XML Schema Definition (XSD) format.

In am embodiment, the present invention comprises a method for updating a tool for software program development to enable the insertion of one or more guards into a host software program during development of the host software program, the tool for software program development being operable to inject the one or more guards into a host software program in response to one or more guard script commands, each of the one or more guards comprising guard instructions that are operable to deter tampering with the host software program, the method comprising the steps of reading one or more guard libraries and/or guard managers, the guard libraries and/or guard managers comprising computer files and computer instructions related to at least one of the one or more guards; deriving a guard script language specification schema from the guard engine, guard libraries, and/or guard managers, the guard script language specification schema comprising syntactical requirements for the guard script commands; deriving documentation for the at least one of the one or more guards from the guard engine, guard libraries, and/or guard managers. In an aspect of this embodiment, the guard script language specification schema comprises an XML Schema Definition (XSD) format. In an aspect of this embodiment, the present invention further comprises the steps of deriving a guard symbol schema from the guard engine, guard libraries, and/or guard managers, the guard symbol schema being useable by the guard injection computer program in carrying out the guard script commands; and populating a graphical user interface of the guard injection computer program with functionality that is consistent with the guard script language specification schema and the guard symbol schema. In an aspect of this embodiment, the guard symbol schema comprises an XML Schema Definition (XSD) format. In an aspect of this embodiment, the tool for software program development is Microsoft Visual Studio.

In an embodiment, the present invention comprises a computer system comprising computer circuitry configured to define a guard schema, the guard schema comprising a syntax for a guard script language; computer circuitry configured to define a guard script, the guard script comprising a protection scheme desired for a host software program; computer circuitry configured to build a document object model using the guard script; and computer circuitry configured to traverse the document object model to build a list of commands for injecting guard instructions into the host software program, wherein the guard instructions are operable to deter tampering with the host software program.

In an embodiment, the present invention comprises a computer system comprising computer circuitry configured to insert markers into a host software program, the markers being arranged within the host software program according to a protection scheme desired for the host software program; computer circuitry configured to define a threat model for the host software program; computer circuitry configured to define constraints on size and performance of the host software program; and computer circuitry configured to inject guard instructions into the host software program in accordance with the markers, the threat model, and the constraints, wherein the guard instructions are operable to deter tampering with the host software program.

In an embodiment, the present invention comprises a computer system comprising computer circuitry configured to read a guard engine program, a guard library, and/or a guard manager, the guard engine, guard library and/or guard manager comprising computer files and computer instructions related to one or more guards and/or one or more guard script commands, each of the one or more guards being operable to deter tampering with a host software program into which each of the one or more guards is installed; computer circuitry configured to derive a guard script language specification schema from the guard engine, guard libraries, and/or guard managers, the guard script language specification schema comprising syntactical requirements for the guard script commands; and computer circuitry configured to derive documentation for the at least one of the one or more guards from the guard engine, guard libraries, and/or guard managers. In an aspect of this embodiment, the guard script language specification schema comprises an XML Schema Definition (XSD) format. In an aspect of this embodiment, the present invention further comprises computer circuitry configured to derive, a guard symbol schema from the guard engine, guard libraries, and/or guard managers, the guard symbol schema being useable by the guard injection computer program in carrying out the guard script commands; and computer circuitry configured to populate a graphical user interface of the guard injection computer program with functionality that is consistent with the guard script language specification schema and the guard symbol schema. In an aspect of this embodiment, the guard symbol schema comprises an XML Schema Definition (XSD) format. In an aspect of this embodiment, the present invention further comprises a tool for software program development.

In an aspect of this embodiment, the tool for software program development is Microsoft Visual Studio.

BRIEF DESCRIPTION OF THE DRAWINGS

The features and advantages of this invention, and the manner of attaining them, will be more apparent and better understood by reference to the following descriptions of embodiments of the invention taken in conjunction with the accompanying drawings, wherein.

DESCRIPTION

Figure 1:
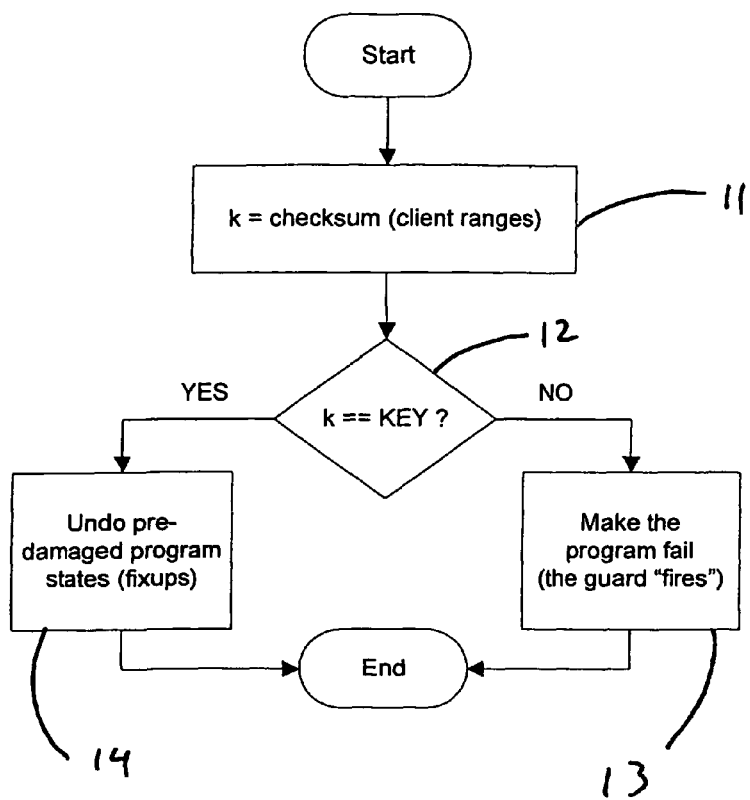
FIG. 1 shows a flowchart illustrating the operation of an embodiment of a checksum guard.

The present invention comprises a system and method for protecting a host software program from unauthorized modification or exploitation. Embodiments of the present invention is adaptable to protect a host software program against reverse engineering, code lifting, unauthorized analysis and access, and the like. A software security mechanism according to the present invention is difficult for a hacker or cracker to detect and/or defeat, but does not impose excessive runtime overhead on the host software program. The present invention further comprises a system and method for automating the injection of a software security mechanism according to the present invention into a host software program.

For the purposes of promoting an understanding of the principles of the present invention, reference will be made to particular embodiments of the present invention, and specific language will be used to describe the same. It will nevertheless be understood that no limitation of the scope of the invention is thereby intended. In addition, certain language elements, commands, and arguments are defined and used herein to illustrate embodiments of the present invention. No limitation of the scope of the present invention is intended by the syntax and grammar chosen therefor. The scope of the present invention extends to cover all semantic equivalents thereof.

In an embodiment, the present invention comprises a software security mechanism comprising one or more "guards," which may be classified into guard "types." A "guard" is a portion of software code of a host software program that makes the software code of the host software program less susceptible to tampering. There are two basic functions most guards perform when they are invoked: detect changes to a portion of the host software program, and respond to the changes. The following "guard types" are present in an embodiment of the present invention: checksum guards, checksum-notify guards, repair guards, anti-debug guards, silent guards, and state full guards.

According to an embodiment of the present invention, when a guard instance is injected into a host software program, the guard's response to detected tampering is automatically selected from a list of possible responses for that guard type. These responses may take many forms, and can range from something as simple and straightforward as terminating execution of the host software program, to more subtle alterations of the data necessary for the host software program to continue normal operation. Many tamper responses corrupt the state of the executing host software program in order to prevent the host software program from operating normally. Typically, the effect of these alterations causes execution of the host software program to be terminated at some later point. Separating the tamper response of a guard from the misbehavior of the executing host software program or termination thereof by the operating system helps disguise the protection the present invention provides. Such techniques make it much more difficult for attackers to detect the presence of guards, identify where guards exist in the protected host software program, analyze when and why guards are invoked, and determine exactly what effect a guard has on the executing host software program. A practitioner of the present invention should be aware that, because the tamper response of guards corrupts the state of the executing host software program in unpredictable ways, the operation of a host software program after a guard has fired may be unpredictable as well.

FIG. 1 shows a flowchart illustrating the operation of an embodiment of a checksum guard. A checksum guard, according to an embodiment of the present invention, ascertains the integrity of host software program code during execution thereof, by first computing one or more "checksums" of the guard's "client ranges," as shown in block 11 of FIG. 1. The client ranges of a checksum guard comprise the region(s) of code in the host software program that are protected by the checksum guard.

A "checksum" is a value calculated from one or more client ranges that is likely to change if such client range(s) is/are modified. In general, the checksum algorithm used by a checksum guard can be any algorithm, as long as it can compute a reasonable digest of bytes in the client ranges. For example, checksum algorithms may be based on a mixed use of basic operators such as "+," "XOR," "logical-AND," shifting, and the like. Computed checksum values preferably are at least 32-bits in length. It is preferred, but not required, that a checksum algorithm according to the present invention uses a "one-way" function, such as, for example, a one-way hash function. A one-way function according to this embodiment can be any function whereby the checksum of a client range is computed in a manner that makes it is impossible thereafter to derive the client range from the value of the checksum, or that makes it impossible thereafter to derive another client range that results in the same checksum as the original client range, except by trial and error.

In the step shown as block 12 of FIG. 1, a checksum guard verifies the correctness of the computed checksum value "k" by comparing it against the expected checksum value for the client range, called a "key." If the computed checksum value differs from the key, the checksum guard has detected a deficiency in the integrity of the evaluated client range(s) of the host software program. As shown in block 13 of FIG. 1, in this event the guard "fires," i.e., the guard takes a predetermined and possibly delayed action inconsistent with the proper execution of the host software program. For example, the guard may make subsequent host software program computations fail by, for example, overwriting data or program instructions in computer memory, damaging the run-time stack, pointing the return address of a live stack frame to a bogus address, corrupting live register values, or initiating an infinite loop.

If the checksum guard does not detect a deficiency in the integrity of the evaluated client range of the host software program, execution of the host software program continues. Optionally, as shown in block 14 of FIG. 1, a checksum guard also may include software code that repairs, or applies "fix-ups" to, some pre-damaged host software program states. For example, to ensure that a hacker or cracker cannot cause a checksum guard to be skipped during host program execution, one or more jump addresses that lead to successor basic blocks may be intentionally corrupted in the host software program file. At run-time, these addresses will be restored to their correct values only if the checksum guard runs to its completion without firing. In addition, if a checksum guard includes fix-up code, when the checksum guard fires, the fix-ups will not be applied, thus leaving the pre-damaged host program states unmodified. This measure is used to ensure that the guard will make the host program fail, even if the guard firing action does not work properly or is defeated by a hacker or cracker.

According to the present invention, and as is explained in further detail herein, checksum guards are "multi-range" guards, capable of protecting any number of noncontiguous client ranges of a host software program. Each client range can consist of any number of bytes. Because client ranges appear to a checksum guard to be sequences of bytes, client ranges can include either program instructions or data bytes, or both. However, in order for a host software program byte to be qualified to be part of a client range, it has to satisfy the following requirements: (i) the byte has to be static, i.e., its value remains unchanged at run-time, and (ii) the byte cannot be part of the key of any guard that directly or indirectly protects the byte, but can be a key of another guard. Accordingly, any host software program bytes that are writeable at run-time ordinarily are not guardable by a checksum guard.

A checksum guard according to an embodiment of the present invention comprises three parts: a memory traversal part, a checksumming part, and an action or response part. The memory traversal is the portion of the checksumming guard that performs the memory reading operation. The checksumming part checks the client range's checksum against a predetermined value. The action part causes the disruption to normal host software program operation that occurs if the checksumming part detects tampering.

In an implementation of checksumming guards according to the present invention, there are 4 different implementations for the memory traversal part, 4 different checksumming algorithms, and 5 different actions. These parts can be combined randomly each time a checksum guard is injected. Accordingly, there are at least 4*4*5=80 different variations of checksum guards in this particular implementation.

In an embodiment, the checksumming part is separated from the action part. Optionally, the action part is configured to determine whether to act on the basis of shared results among two or more checksumming parts. This makes it more difficult for an attacker to detect, analyze, and defeat the checksum guard.

By tying together checksum guard components with hard-to-analyze connections, complex guard networks can be created. If the components are invoked at different locations, instantiated multiple times, and share detection results, the network is randomized and even more difficult to analyze.

Further description of checksum guards can be found in U.S. patent application Ser. No. 10/620,534, the disclosure of which is incorporated herein by reference.

Figure 2:
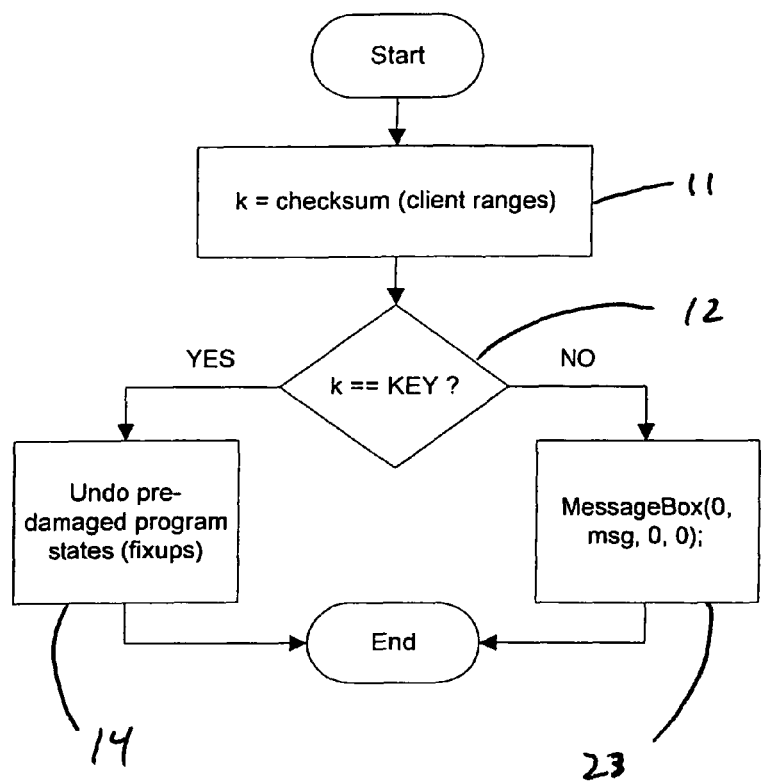
FIG. 2 shows a flowchart illustrating the operation of a checksum-notify guard according to an embodiment of the present invention.

FIG. 2 shows a flowchart illustrating the operation of checksum-notify guards according to the present invention. As shown in FIG. 2, checksum-notify guards operate like checksum guards, except that when checksum-notify guards fire (as shown in block 23 of FIG. 2) a message is displayed on the program user's computer monitor. In an implementation of checksum-notify guards, the well-known "Message-Box( )" function is used to create a customizable message. Checksum notify guards are intended to explicitly notify the program user about the tampering, rather than to implicitly cause the program to fail.

A repair guard, according to an embodiment of the present invention, restores the integrity of a single client range by overwriting the client range. The "key" of a repair guard comprises the code that overwrites the client range (possibly encrypted), or an address at which such code can be found. The repair guard key may be disguised or encrypted. A repair guard key is static and can be guarded by other guards. After a repair guard's key is created (as discussed hereinafter), the client range may be intentionally corrupted. Thus, when a repair guard fires, the damaged client range is overwritten with the code stored as the key, and the host software program executes properly. If a repair guard is defeated by an attacker, the damaged client range is not overwritten, and the host software program fails.

The following pseudocode example shows the operation of an embodiment of a repair guard according to the present invention:

```
char KEY[max_size]; // stores disguised copy of original
    bytes
* * *
For (each byte address in the client range);
    {
    get (the original byte from KEY);
    write (the byte to the byte address in the client range);
    }
```

In an embodiment of the present invention, repair guards are single-range guards limited to protecting one client range, i.e., one continuous sequence of bytes. A repair guard's client range need not align with the boundaries of program instructions or data. To a repair guard, a client range is treated as a sequence of bytes, and the guard overwrites the bytes with original values regardless of their nature. In another embodiment, a repair guard may be multi-ranged. Thus, a single repair guard of this embodiment is able to handle N client ranges.

In order for a host software program byte to be qualified as part of a repair guard's client range, it has to satisfy the following requirements: (i) the byte has to be static, i.e., its value remain unchanged at run-time, and (ii) the byte cannot be part of the key of any guard that directly or indirectly protects the byte, but can be the key of another guard. Accordingly, any host software program bytes that are writeable at run-time ordinarily will not be guardable by a repair guard.

Further description of repair guards can be found in U.S. patent application Ser. No. 10/620,534, the disclosure of which is incorporated herein by reference.

A frequent tactic employed by hackers and crackers is to use software debugging programs (called "debuggers") to analyze a host software program during execution. The present invention comprises anti-debug guards that detect the presence of debuggers running a host software program in which the anti-debug guards are injected. Anti-debug guards differ from other guard types in that anti-debug guards do not have keys. Anti-debug guards also have no client ranges to protect.

In an embodiment, anti-debug guards may be adapted to detect many debugger tools based on the default way such debugger tools handle interrupt 3. Interrupt 3 is known as the breakpoint interrupt. It can be invoked by executing an "int 3" instruction or by calling "RaiseException( )" in a software program. Invocation of interrupt 3 (in the form of throwing an exception of the "breakpoint" type) lets a debugger tool know that a breakpoint in the software program has been reached. If the program is not being debugged at the time, the breakpoint exception will fall back to the program. If the program includes exception handling code appropriate for a breakpoint exception, the program then may "handle" the exception (i.e., may be able to continue execution of the program instructions). Otherwise, the program may terminate normal operation.

If the program is being debugged at the time a breakpoint exception is thrown, then the debugger tool is supposed to handle this exception on the program's behalf by doing whatever is necessary about the breakpoint exception such as, for example, displaying the contents of the CPU registers at that point. After handling the exception, the debugger tool normally resumes execution of the program from the point after the interrupt invocation, without passing the exception back to the program. From the debugger tool's point of view, the exception has been handled and there is no need for the program to handle it further.

To detect debugger tools that recognize breakpoint exceptions as above, anti-debug guards according to the present invention detect whether or not there is a debugger tool catching a breakpoint exception without passing it to the program. The anti-debug guards intentionally throw a breakpoint exception (by executing an "int 3" instruction) and try to catch it back, using exception handling code that is part of the anti-debug guard. If the exception handling code is not executed, then it means a debugger tool is present and has handled the exception for the host software program, in which case the anti-debug guard fires. Otherwise, the anti-debug guard takes no action or reports that no debugger tools are present. It also is within the scope of the present invention that an anti-debug guard can detect the presence of a debugger tool and fire accordingly, but instead of handling the breakpoint exception within the anti-debug guard code, the breakpoint exception is passed to the host software program for handling. Thus, the anti-debug guard becomes more difficult to detect.

Figure 3:
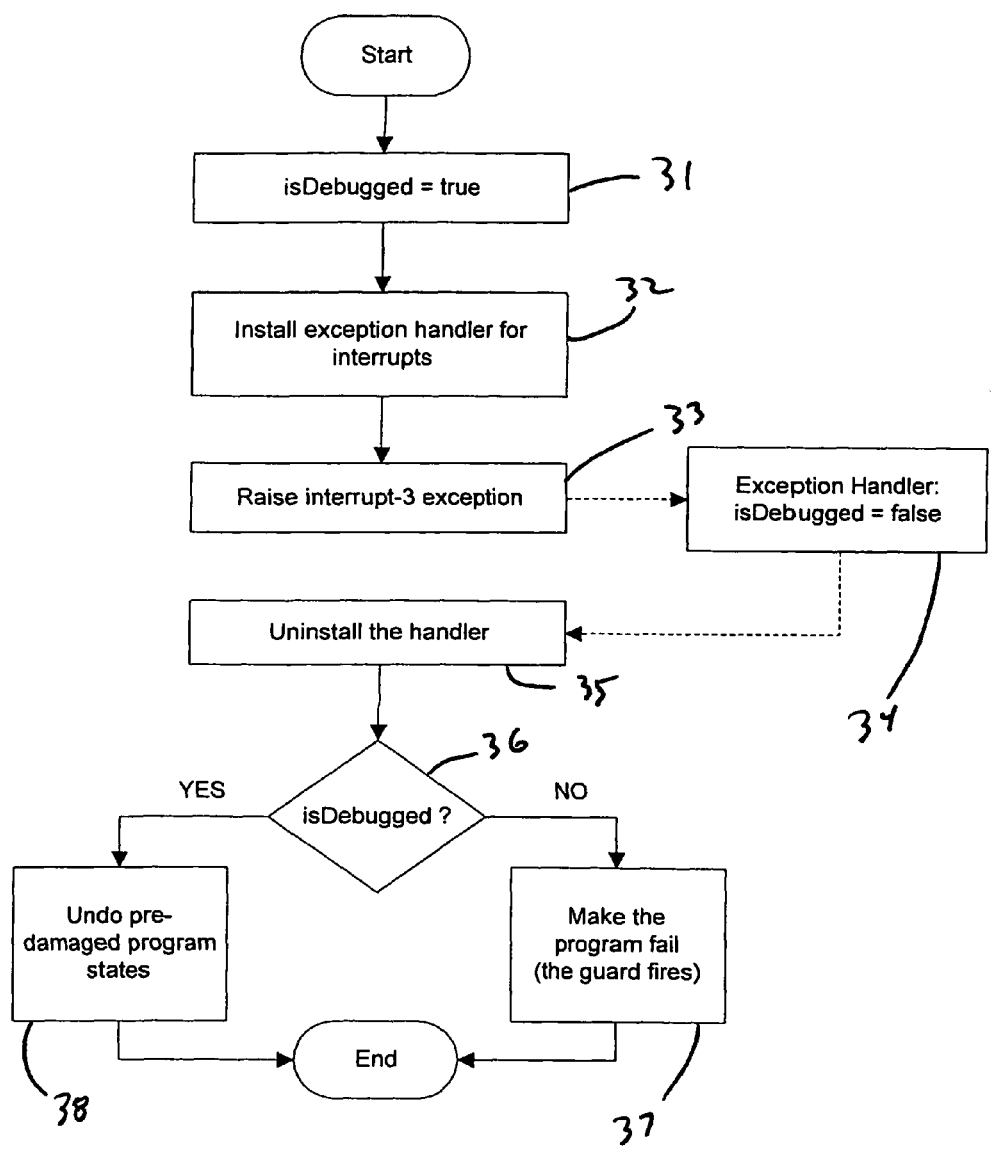
FIG. 3 shows a flowchart illustrating the operation of an anti-debug guard according to an embodiment of the present invention

FIG. 3 shows a flowchart illustrating the operation of an anti-debug guard according to the present invention adapted for an interrupt 3 scheme. In the step shown as block 31, the variable "is Debugged" in the anti-debug guard is initialized to a value of "true." Exception handling program instructions are dynamically injected by the anti-debug guard in the step shown as block 32, and the anti-debug guard raises an interrupt 3 exception in the step shown as block 33.

In the step shown as block 34, if the interrupt 3 exception is handled by the exception handling program instructions injected by the anti-debug guard in the step shown as block 32, the value of the is Debugged variable is changed to "false" (otherwise, the value is not changed). The exception handling program instructions injected by the anti-debug guard in the step shown as block 32 are removed in the step shown as block 35.

In the step shown as block 36 of FIG. 3, the is Debugged variable is evaluated. If the value of is Debugged is "false," the guard "fires," as shown in block 37. For example, the guard may make subsequent host software program computations fail by, for example, overwriting data or program instructions in computer memory, damaging the run-time stack, pointing the return address of a live stack frame to a bogus address, corrupting live register values, or initiating an infinite loop.

If the value of is Debugged is "true," execution of the host software program continues. Optionally, as shown in block 38 of FIG. 3, an anti-debug guard also may include software code that repairs, or applies "fix-ups" to, some pre-damaged host software program states. For example, to ensure that a hacker or cracker cannot cause a anti-debug guard to be skipped during host program execution, one or more jump addresses that lead to successor basic blocks may be intentionally corrupted in the host software program file. At run-time, these addresses will be restored to their correct values only if the anti-debug guard runs to its completion without firing. In addition, if a anti-debug guard include fix-up code, when the anti-debug guard fires the fix-ups will not be applied, thus leaving the pre-damaged host program states unmodified. This measure is used to ensure that the guard will make the host program fail, even if the guard firing action does not work properly or is defeated by a hacker or cracker.

In an embodiment, anti-debug guards according to the present invention can be adapted to detect the SoftICE™ debugger tool available from Compuware Corporation. The SoftICE debugger tool cannot be detected using the interrupt 3 scheme, because the SoftICE debugger tool passes all breakpoint exceptions back to the host software program. However, the SoftICE debugger tool reacts to "single-step" exceptions, raised by the invocation of "interrupt 1" (such as by executing an "int 1" instruction) in a way that enables its detection by an anti-debug guard. When it encounters an invocation of interrupt 1, the SoftICE debugger tool increments the instruction pointer by two bytes (the length of instruction "int 1") before it passes the single-step exception back to the program for handling. The pointer increment is used to skip over the instruction, i.e., if the SoftICE debugger tool is not present, the instruction pointer will point to the beginning of the "int 1" instruction instead. An anti-debug guard adapted for the SoftICE debugger tool detects the presence of the SoftICE debugger tool by checking whether or not the two byte increment to the instruction pointer is made in response to an "int 1" instruction generated by the anti-debug guard. If so, the anti-debug guard fires.

The techniques employed by anti-debug guards to detect the presence of debugger tools are customized to individual debugger tools, so the effectiveness of anti-debug guards depends on the actual debugger tools used in an attack in the host software program. In addition, the effectiveness of anti-debug guards may depend on the operating system on which host software program is executed.

According to the present invention, a silent guard makes a host software program's execution depend on an additional data value called a "source." The source, when expressed as a numerical value, will be involved in a computation necessary for the host software program to execute correctly. A silent guard compares the source with an expected data value and modifies the execution of the host software program if the data values do not agree.

A silent guard may utilize simple, and for the attacker innocuous, computations for making its comparison. For example, a silent guard may utilize computations such as addition, subtraction, exclusive or ("XOR"), or and/or. The execution of the silent guard comprises the execution of this computation. If the source is corrupted, the computation fails to return the expected result. The corruption is detected by the silent guard, which then fires.

A silent guard may be adapted so that its firing can cause a variety of results. For example, a silent guard can cause other arithmetic computations to produce incorrect results, which can ripple through the program without actually resulting in a program crash.

In another example, a silent guard can recompute the address of a jump target of a dead register, which almost always results in a program crash if the expected value of the jump target is not present. An immediate crash may be disadvantageous in that it may assist a hacker or cracker in identifying the location of the silent guard.

In yet another example, a silent guard can modify a live register, which may have a delayed impact that is hard to detect. However, the expected source value may be visible in the code, which may be disadvantageous in that it may assist a hacker or cracker in defeating the silent guard. In addition, although the guard firing action will modify the live register, its impact may be unknown and unpredictable.

Silent guards are useful to protect against password modification. Attackers often modify the stored password or the stored derivative (e.g., a hash) of the password. This can be avoided if silent guards are injected in the password routine, to ascertain that the password variables contain the correct values for the password.

The advantages of silent guards are enhanced when the source is hard for an attacker to extract from the host software program. Preferably, the source is dependent on user input. In addition, the advantages of silent guards are enhanced when the source is readily available to the guard, without expensive interim computations. Other advantageous implementations of silent guards involve guard firing results that are predictable and that are hard to separate from the host software program.

Further description of silent guards can be found in U.S. patent application Ser. No. 10/620,534, the disclosure of which is incorporated herein by reference.

State full guards according to an embodiment of the present invention comprise two steps. In the first step, called the "check" step, the value of a global variable (called a "state") is set or reset. In the second step, called the "action" step, the value of the same global variable is evaluated, with the state full guard firing if the global variable does not have the expected value. Depending on the impact of the action, there needs to be an execution flow relationship between the check step and the action step. There might be intermediate steps that modify the value of a global variable, so that the value of a global variable does not appear to be static.

In a simple binary case, the global variable can be initialized in one of two different states, e.g., "good," meaning that the global variable has a value that will not cause the state full guard to fire during the action step, or "bad," meaning that the global variable has a value that will cause the state full guard to fire during the action step. This is not intended to imply that the global variable must be Boolean. Any real number, integer, string, or other variable type may be the global variable for a state full guard.

If the global variable is initialized in the good state, then, according to an embodiment of the present invention, the action step can be executed many times before the check step, but the action step needs to be executed at least once after the check step. If the global variable is initialized in the bad state, then the check step needs to take place at least once before the action step, but can take place many times after the action step.

Because global variables are used, state full guards are "thread-safe." A "thread" is defined as an entity that has allocated its own CPU time and stack, but can share code and global data with other threads by using private/public definitions for code and data segments. The thread's stack is always private to the thread.

The advantages of state full guards are enhanced when the relationship between the check step and the action step is enforced by a user action, i.e., user action causes the global variable to have the appropriate state or value after the check step. In addition, the global variable state should be hard to infer for the attacker. For example, in an implementation, it may be dynamic and may be obfuscated. A state full guard should be implemented so that it is difficult for an attacker to link the check step and the action step. The check step and the action step may consist of many component steps, and may be far apart in the execution flow of the host software program. The state full guard global variable also could be a source for a silent guard. Linking a state full guard's check step and action step can be made harder for the attacker by modifying the state between the check step and action step.

The state also can be stored as a bit mask where only some bits are used, e.g., 0=good, 1=bad. In addition, the result of two different check steps can be combined using the logical "or" operation, and then the combined result can be tested using the logical "and" operation. Thus, check step result "A" may be combined with check step result "B" using the logical "or" operation. The combined A and B is "bad" if the combined ((A "or" B) "and" 1) is 1. The other bits can be modified randomly. The only operations used are "and" and "or" operations, which are common in almost all programs.

The advantages of state full guards may be enhanced when the action step is injected in a portion of the host software program that is executed well after the check step, or in an infrequently executed portion of the host software program. Attackers often don't fully test a cracked program, but instead test whether they are able to bypass the protection and continue. Putting a state full guard action step in a portion of the host software program that executes, for example, every Monday or after three months can frustrate users of the cracked program, and be hard to detect for an attacker.

In an embodiment of the present invention, each guard type comprises a debug mode that, if enabled, configures guards of that guard type to run inside a debugger tool. Thus, when designing a host software program protection scheme and writing a guard script, it is possible to set a guard's debug mode so that, during testing of the protected host software program using a debugger tool, a practitioner can determine whether a guard injected into the host software program behaves as expected. If debug mode is enabled, debug messages concerning the guard's behavior are emitted. The messages appear in the log of the debugger tool. The debug messages can report certain runtime events such as, for example, whether the guard code is invoked; whether the guard code executes; whether the guard fires; and whether the guard exits. When the debug mode is enabled, the guard's response action is disabled. Emitting debug messages replaces the response action. When the debug mode is disabled, the guard's response action is re-enabled. Accordingly, the debug mode can enabled during testing of a protected host software program, and then disabled when the protected host software program is determined to be operating correctly. The guard debug mode of the present invention should not be confused with the anti-debug guards also disclosed herein.

The protection provided by any of the guard types discussed herein is enhanced through the use of obfuscation techniques, such as hiding the guards and other information that might assist an attacker in defeating the protection.

Figure 4:
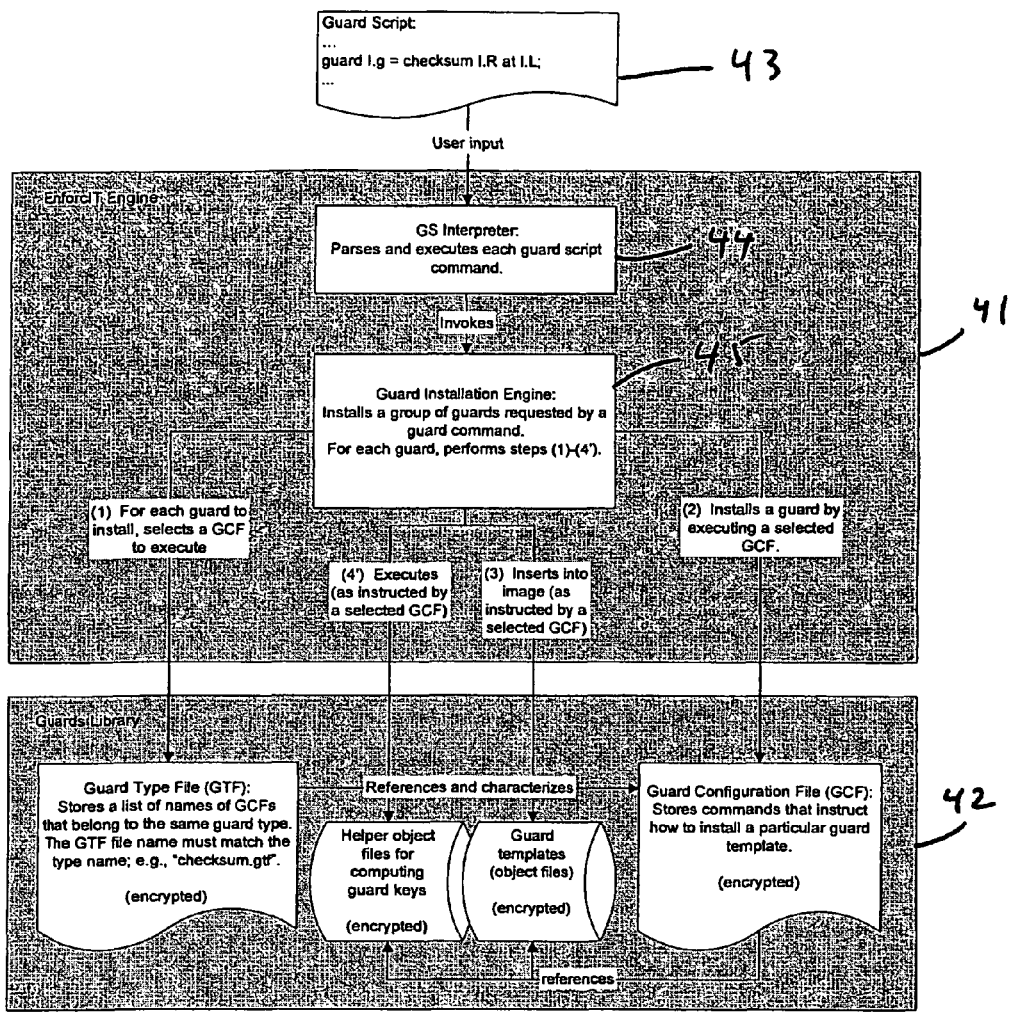
FIG. 4 shows a schematic block diagram of a guard injection computer program according to an embodiment of the present invention.

An embodiment of the present invention comprises a computer program that automates the injection of guards into a host software program. FIG. 4 shows a schematic block diagram of an embodiment of a guard injection computer program according to the present invention. As shown in FIG. 4, the guard injection computer program of this embodiment comprises guard processing engine 41 and guard library 42. Guard processing engine 41 comprises guard script interpreter 44 and guard processing engine 45. Guard library 42 comprises a plurality of computer files containing data and information about the guard types that are available for injection into the host software program.

Guard script interpreter 44 is operable to interpret and execute guard script 43, which may be provided by a user of the guard injection computer program (as discussed hereinafter). Guard script 43 of this embodiment comprises computer instructions that, when executed by the guard injection computer program of the present invention, enable the guard injection computer program to inject guards into a host software program.

Guard script interpreter 44 is further operable to invoke guard processing engine 45. Guard processing engine 45 is operable to interact with guard library 42 to retrieve data and information about the guards that are to be injected in the host software program, and then is operable to process such data and information to inject the guards into the host software program.

Guard library 42 comprises guard type files, guard configuration files, and guard templates. A "guard template" contains the guard's computer instructions that will be injected into the host software program, but may not contain certain guard parameters such as, for example, the client range(s) and the guard key. A "guard type file" contains a guard entry corresponding to each guard template of a particular guard type. Each guard type that is available for injection has its own guard type file stored in guard library 42. A "guard configuration file" is a script comprising computer instructions that, when executed by guard processing engine 45, causes guard processing engine 45 to inject one or more guards into the host software program. There is at least one guard configuration file for each guard type.

A guard type file contains a "guard entry" for each available guard template that implements a guard of that guard type. For example, a guard type file called "checksum.gtf" may contain a guard entry for each of a plurality of different checksum guard templates. When guard processing engine 45 needs to inject a guard of a particular type, it selects a guard template from the corresponding guard type file. Guard processing engine 45 may be adapted to select a guard entry randomly from the plurality of guard entries in the guard type file.

In order for guard processing engine 45 to locate a guard type file, the path for the guard type file (i.e., the location of the guard type file in guard library 42) must be known by guard processing engine 45. During execution of a guard processing engine according to an embodiment of the present invention, guard processing engine 45 loads a guard type file only once, the first time a guard of that type is injected. If the guard type file is encrypted, guard processing engine 45 decrypts the guard type file and parses the guard entries. Later, guard processing engine 45 accesses the parsed guard entries each time it wants to inject a guard of that guard type.

Each guard entry in the guard type file points to a guard configuration file. In addition, each guard entry also contains some information about the guard itself such as, for example, the number of client ranges the guard can handle, or the number of fix-ups the guard has.

In an embodiment of the present invention, a guard type file is an encrypted text file. Each line in the guard type file is either a comment line (that starts, for example, with the pound character ("#")), an empty line (that contains only white spaces), or a guard entry line. Each guard entry line in this embodiment of a guard type file has the following exemplary pseudocode syntax:

GCF client_ranges [max_range_sz] hooks [fixups [deferred [no_jmp [register_flags [min_size]]]]]

The argument "GCF" designates the path to the storage location of the appropriate guard configuration file in guard library 42.

The argument "client_ranges" identifies the number of non-contiguous client ranges that the guard that corresponds to the guard entry can handle. In an implementation of this embodiment, "0" means that the guard can handle any number of client ranges (i.e., it is a multi-range guard). A non-zero value "N" means that that the guard can handle N client ranges.

The argument "max_range_sz," if provided, identifies the maximum size of each client range in bytes. If the number of client ranges is zero, then this field is undefined.

The argument "hooks" identifies the number of locations to invoke the guard. In this embodiment of the present invention, only one hook is possible, so the value of the argument "hooks" is always "1".

The argument "fixups" identifies the number of fix-ups the guard uses. A fix-up is a location in the guard that holds a corrupted address of a successor basic block dominated by the guard. The corrupted address will be corrected at run-time only if the guard has run to its completion without firing.

The argument "deferred" identifies the number of state variables for a state full guard.

The argument "no_jmp" identifies whether a jump instruction is used to end the guard. In this embodiment of the present invention, "1" means a jump instruction is used, and "0" means a jump instruction is not used.

The argument "register_flags" provides the requirements for saving/restoring or overwriting live registers/CPU flags at the guard invocation site. Use of this argument is optional in this embodiment of the present invention. When used, register_flags comprises a 17-bit word, wherein bits 0-7 correspond to registers EAX, ECX, EDX, EBX, ESP, EBP, ESI, and EDI, respectively. If such a bit is set, it indicates the corresponding register must be live in all subsequent execution paths (i.e., each subsequent execution path must first use the register before killing it). Bits 8-15 correspond to EAX, ECX, EDX, EBX, ESP, EBP, ESI, and EDI, respectively. If such a bit is set, it indicates the corresponding register must be killed in all subsequent paths. If the bit is not set, there is no such requirement. If bit 16 is set, all OF, SF, ZF, AF, and PF flags must be killed in all subsequent paths. If the bit is not set, there is no such requirement.

The argument "min_size" is an optional argument in this embodiment of the present invention. It identifies the minimum size of a client range for the guard. If the min_size argument is 0, client ranges of all sizes are guardable.

In an embodiment of the present invention, a guard configuration file is an encrypted text file. Each line in the guard configuration file is either a comment line (that starts, for example, with the pound character ("#")), an empty line (that contains only white spaces), or a guard configuration file command. In an embodiment, the present invention provides for only three guard configuration file commands: TEMPLATE, SYMBOL, and PATCH. All guard configuration file commands are line-based.

In an embodiment of the present invention, the TEMPLATE command must appear once, and only once, as the first command in the guard configuration file. The TEMPLATE command creates a copy of a guard template (which, in an embodiment of the present invention, is stored as a PE object file in guard library 42) and injects the copy into the host software program. All ".text" sections of the guard template are injected into the host software program as executable code, and the other sections of the guard template are injected into the host software program as data blocks. If any data sections have no actual contents but have a logical size greater than zero, guard processing engine 45 allocates space for them in the software program as well.

In an implementation of this embodiment of the present invention, the TEMPLATE command has the following exemplary pseudocode syntax:

TEMPLATE [<param, . . . >] [ENTRY entry[( )]] template_obj_file [CLIENT (clientRVA clientLen)+: (keyRVA keyLen)+]

The "param, . . . " arguments comprise an optional list of input arguments from guard script 43. When provided, the angle bracket pairs ("<" and ">") must be present according to this implementation.

The "entry" argument comprises an optional code label representing the guard entry point. If not given, guard processing engine 45 assumes the first instruction of the first executable section of the host software program to be the entry point of the guard. If "( )" is given (as above), the entry point is the entry of a function that has a "ret" instruction. Otherwise, the guard code is not a function, and a jump instruction will be inserted at the end of the guard code to ensure the execution flow will go back to the caller.

The argument "template_obj_file" is the path to the storage location of an object file to be used as a guard template.

The "CLIENT" argument is another optional argument. If present, it indicates that the guard will protect some client code, and have a guard key. Otherwise, the guard has no client code or key.

The "(clientRVA clientLen)+" arguments supply one or more pairs of client range relative virtual addresses ("RVAs") and client range lengths that define the client ranges of the guard. For multi-range guards, clientRVA must be "clientList" and clientLen must be "4." For N-range guards, each pair is a pair of "clientRVAi" and "clientLeni" for each $0 \leq 1 < N$.

The "(keyRVA keyLen)+" arguments, if present, represent one or more guard key ranges (in the form of RVA and length pairs). This mechanism allows the guard to declare to guard processing engine 45 that it has a key and where it is located.

The SYMBOL command gives a symbolic name to a value. It is useful for representing values used by the PATCH command (discussed hereinafter). However, if the value for defining the symbol is itself undefined (e.g., the value is actually an expression that contains another undefined symbol), then the symbol will not be defined even if the SYMBOL command is present in the guard configuration file. In that case, that SYMBOL command is silently ignored (as discussed hereinafter) by guard processing engine 45.

In an embodiment of a guard configuration file according to the present invention, each symbol can only be defined once, and the defined value cannot be changed later. In an implementation of this embodiment of the present invention, the SYMBOL command has the following exemplary pseudocode syntax:

```
SYMBOL symbol size = value [(+|−) value]
        |    (+|−) value
        |    FUNCTION funcObj [ENTRY entry[( )]] [OF symbol+]
        |    IMPORT programLabel
        |    RANDOM [min [max [isprime]]]
```

The "symbol" argument contains the name of the new symbol to be defined.

The "size" argument defines the size of the symbol value (in bytes). It can be an integer or another symbol.

The "value" argument can be an integer or another symbol.

The "FUNCTION" argument, if present, indicates the execution of an external object file, the result of which is assigned to the new symbol. In one implementation of this embodiment, execution of the object file returns a pointer to the result via the EAX register. Guard processing engine 45 then copies the contents of this pointer up to "size" bytes to the symbol's internal storage. The argument "funcObj" is the path of the external object file to execute. The optional argument "entry," if provided, identifies the entry point label of the external object file. Otherwise, the first instruction of the first executable section thereof is assumed to be the entry point. If "( )" is provided, the entry point label is a function name; otherwise, it is not a function. The optional "symbol+" argument designates one or more symbols that the external object file depends on for execution. The presence of these symbols is intended to set up some dependency between the external object file and a set of symbols defined by the guard configuration file, such that if any of the symbols is not defined, the external object file cannot be executed.

The "IMPORT programLabel" argument obtains the RVA of a label defined in the host software program. This allows the host software program or system API's used in the host software program be visible by a guard.

The "RANDOM" argument selects a random number within a range of numbers. The "min" argument, if given, defines the minimum number of the range. Otherwise, 0 is assumed to be the minimum number in the range. The "max" argument, if given, defines the maximum number of the range. Otherwise, 0xffffffff is assumed to be the maximum number of the range. The selection can be optionally restricted to prime numbers only. The optional "isprime" argument designates whether the selection is restricted to prime numbers. Its value is "1" if the result must be a prime number, and "0" (the default) if the result is not required to be a prime number.

The PATCH command is used to patch values into the guard code or an external object code. It serves as a means to transfer data from the guard configuration file to the guard template or object code. In an implementation of this embodiment of the present invention, the PATCH command has the following pseudocode syntax:

PATCH symbol (TEMPLATE|FUNCTION funcObj)

The "symbol" argument defines the value to be patched. All locations in the guard code or external object file that refer to the symbol are patched with this value.

The "TEMPLATE" argument is used if a guard is the patch target. The "FUNCTION funcObj" argument is used where an external object file is the patch target.

In addition to the TEMPLATE, SYMBOL, and PATCH commands, in an embodiment of the present invention, the following special guard configuration file symbols are used by guard processing engine 45 when executing a guard configuration file:

any_bb_address: Populated with the RVA of a randomly selected basic block.

any_number: Populated with a 32-bit random number.

clientList: For multi-range guards only, populated with a pointer to the address table of a guard (discussed hereinafter), which uses that table for accessing its client ranges.

clientRVAi, clientLen i: For fixed-range guards that handle N ranges, populated with the starting RVA and length of each client range i, where $0 \leq 1 < N$.

fixupbase: For a guard that provides fix-up protection, populated with the base address of a table that contains all fix-up locations the guard needs to manipulate at run-time.

_fixupk: For a guard that provides fix-up protection, populated with the set of correct values to be patched to the fixupbase area when the guard executes without firing.

image_base_when_loaded: Populated with the base address of the image used in computing a guard key.

next_bb_address: Populated with the absolute address of the first basic block in the site returned from a guard invocation.

optional_header_imagebase: Populated with the image base address as shown in the optional header of the program.

rvaList: For multi-range guards only, populated with a pointer to the RVA table for computing a guard key.

Guards script 43 comprises one or more "guard script commands" that specify to guard processing engine 41 of the present invention which host software program to protect and how to protect it. For example, the placement and type of guards injected by guard processing engine 41 is specified by guard script commands in guard script 43. In an embodiment, the present invention comprises a guard script language, comprising the following exemplary guard script commands:

| | |
|---|---|
| image | Loads a host software program file into the guard |
| image_cmd | processing engine. |
| guard | Injects guards code into a loaded host software |
| guard_cmd | program image. |
| network | Injects code for a distributed network of guards. |
| obfuscate | Makes the appearance of host software program instructions and host software program control flow harder to understand. |
| random | Specifies the seed for randomizing host software program |
| seed | transformations. |
| range | Assigns a name to certain host software program code. |
| range_cmd | |
| location | Assigns a name to certain host software program |
| location_cmd | locations. |
| reserve | Excludes selected host software program code |
| reserve_cmd | from protection. |
| unreserve | Removes restrictions imposed by the reserve command. |
| unreserve_cmd | |

In an embodiment of a guard script language according to the present invention, certain guard script commands allow a user to assign a name to an element of the host software program so other commands can refer to this element by name. In an implementation of this embodiment, there are four types of such names (called "IDs") used:

| | |
|---|---|
| guard_id | The ID assigned to a guard. |
| image_id | The ID assigned to a loaded host software program image. |
| location_id | The ID assigned to a host software program location. |
| range_id | The ID assigned to a host software program range. |

When a guard script 43 is executing, numerous transformations are made to the host software program. During this process, a guard processing engine according to the present invention ensures that an assigned ID remains associated with the corresponding host software program elements, regardless of how such elements may be transformed.

The acceptable syntax for an ID may vary from one embodiment of the present invention to the next. In an embodiment of a guard script language according to the present invention, an ID: (i) may be composed of case-sensitive letters, numbers, and underscore characters such as a-z, A-Z, 0-9, _; (ii) may not begin with a number; (iii) must be distinct from any other ID used anywhere in the guard script; and (iv) may not contain any strings that are reserved for other uses in the embodiment of the guard script language. In an embodiment, reserved strings may include the following: and, at, code, dir, empty, guard, image, in, key, label, level, location, network, obfuscate, out, random, range, reserve, size, unreserved.

The image guard script command is used to prepare a host software program for protection. A user may load multiple executable host software program images in a single guard script. However, it is preferred to have only one host software program image per guard script. The following pseudocode shows an exemplary image command according to an embodiment of the present invention:

image image_id="input_file"
  [dir "path"[, . . . ]]
  [out "output_file"]
  [size max_size [%]];

An image command of this syntax has the following arguments:

| | |
|---|---|
| image_id | The name assigned to the loaded host software program image. |
| input_file | A file name or the fully qualified path name of a host software program image assigned to the image_id. |
| path | One or more additional directories in addition to the directory of the input file where host software program files and any auxiliary files required for loading the host software program exist. |
| output_file | The file name for the protected version of the input_file. If none is specified, input_file._x_is used by default. The input_file and output_file may not have the same name. |
| max_size [%] | During the protection process, the guard processing engine makes the output_file larger, as necessary, to complete protection. This parameter specifies the maximum allowable size of the output_file, in bytes or as a percentage of the original input_file size. If no max_size is specified, the default is 150%. |

When an image command is executed, it loads a host software program file into computer memory, and produces an image thereof that is ready for subsequent guard script operations. In an embodiment of the present invention, the host software program is a Windows 32-bit executable program file produced using Microsoft Visual C++ compiler or other compiler. Other types of programs also may serve as host software programs.

The image_id argument is used to specify a name for the image, and defines the name space of all guards, locations, and ranges applied to, or defined in, the image.

In addition to specifying the name of the executable file, the directory containing the input_file argument is also used when searching for ancillary files needed by the protection process. The path argument is used to specify directories (in addition to the directory containing the input_file) where any resources needed by the guard processing engine can be found. The directories are searched in the order specified in the path argument, with the directory containing the input_file searched first. Directories specified in the path parameter can be fully qualified paths or a path relative to the directory where the guard injection computer program of the present invention is executed.

The output_file can be specified as an absolute path or a relative path. If output_file is an absolute path, the output file is stored at that location. If it is a relative path, the path is relative to the directory where the guard injection computer program of the present invention is executed.

According to an embodiment of the present invention, an image of the host software program is loaded into computer memory, it automatically maps the contents of the image into program instructions and basic blocks, analyzes the control-flow relationships, and translates any source code markers (discussed hereinafter) to their physical program addresses. If the host software program is an executable file, in order to successfully load the image the guard processing engine requires access to a number of the ancillary files that were used or generated by the compiler and linker when the executable was compiled. These may include the memory map and object code files of the host software program.

The memory map file is produced as part of the host software program compilation process, and is assumed to have a file name consistent with the input_file file name. For example, if the input file is myprogram.exe the memory map file name must be myprogram.map. It is important all related files are consistent with each other, or the guard processing engine mapping will not be correct. If any inconsistency is detected, the protection process may be aborted.

If the guard processing engine does not find all of the object or library files used by the host software program, the protection process may be aborted. If a user wishes to load an image and does not have access to all the necessary object or library files, in an embodiment of the present invention, the user may use the "/pm" (partial mapping) argument to the guard processing engine. When this option is used, only those parts of the host software program that correspond to the available object and library files will be mapped by the guard processing engine. When the protection process is applied to a partially mapped program, the unmapped portions of the executable will not be protected. The unmapped code is filtered out of the image before the executable is guarded or modified.

At the end of the host software program image loading process, the size of the image is increased in preparation for the protection process. In an embodiment of the present invention, the initial amount allocated is half of the maximum increase specified by the max_size parameter. For example, if no max_size is specified in the image command, the default may be 150% of size of the image. Thus, when the image is loaded, the image size is increased to 125% (half of the maximum increase) of the size of the compiled image. This extra space is used by the guard processing engine, and may be increased by guard commands (discussed hereinafter), up to the limit specified by the max_size parameter. In an embodiment of a guard processing engine according to the present invention, setting the max_size parameter to less than 100% results in an error.

After the host software program image has been loaded, the image_ID represents the entire loaded image. In an embodiment of the present invention, this ID can be used in the following ways:

As a range ID within the context of a range command (as discussed hereinafter).

To allow access to any of the ranges and locations defined in the host software program (as discussed hereinafter).

To provide access to ranges, locations, and guards defined in the guard script, as described in the other guard script commands.

To provide access to the following predefined guard processing engine functions:
image_id.empty (bytes)
image_id.code ("keyword" [, ... ])
image_id.label ("keyword" [, ... ])

The image_id.empty (bytes) function allocates a set of empty areas in the image with a total size equal to the value of the bytes parameter. These areas are unused portions of the host software program that can be used to store new guard code, or to store code displaced or generated by other guard script commands. If the image already contains empty space, this function will allocate enough additional empty space to increase the total available empty space only to the requested amount defined by the bytes parameter. This function will not increase the size of the image above the limit specified by the max_size parameter. If the max_size is exceeded, an embodiment of the guard processing engine reports an error, and the protection process is terminated.

The image_id.code ("keyword" [, ... ]) function can be used to refer to the code of any function or object module whose name in the map file contains all of the keywords in the list. This mechanism allows a source-level function or file to be identified at the binary level by portions of its name. Each line of a typical map file (such as, for example, a map file created by compiling a program written using Microsoft Visual C++) corresponds to a code segment, and contains two case-sensitive names: (i) the name of the object module in the "Lib:Object" column, and (ii) the name of the function in the "Publics by Value" column. These two names allow a user to identify each code segment at the function or object module level.

For example, given an image_ID of "I", a function with the syntax I.code (foo) would search the map file for lines where the string "foo" appears. Note, however, that this includes any partial match of the string, including, for example, "foo.obj," "foodstuff," and "barefoot." If a match is found, the function will refer to the locations in the image where the compiled code of the matched function(s) is/are stored. If the keyword refers explicitly to an object file with the same name linked to the host software program image, and no other line in the map file contains this string, the function will refer to the locations in the host software program image where the compiled code from that object file is stored. If a code segment is not physically present in the host software program image, it will not be returned by this function, even if the code segment's name appears in the map file.

The image_id.label ("keyword" [, ... ]) function returns the starting locations of any functions or labeled code segments whose names in the map file contain all of the keywords in the list. This function allows the beginning location of a source-level function or labeled code segment to be identified at the binary level by portions of its name. The name space searchable by this function is the names provided in the "Publics by Value" column in the map file. If a code segment is not physically present in the host software program image, it will not be returned by this function, even if the code segment's name appears in the map file.

The following pseudocode example illustrates a use of the image command:

image Wizard="release\myprogram.exe"
        dir "c:\Microsoft VS\vc98\lib", "."
        out "out.exe"
        size 200%;

This pseudocode example loads a host software program named "release\ myprogram.exe" and assigns the image an ID of "wizard." When the host software program is loaded, the guard processing engine searches for any auxiliary files (such as myprogram.map, and any object, library, and source files) in the following directories, in the specified sequence:

1. release
2. c:\Microsoft VS\vc98\ lib
3. . (i.e., the current directory)

The "release" directory is added to the search path as a side effect of specifying the input file. When the engine completes its operations, according to this example the output file is saved to a file called out.exe in the current directory. The file size is limited to no more than 200% of the original host software program size according to this example.

A guard command injects one or more guards in a loaded host software program image. Each guard command allows a user to inject one "type" of guard into a compiled host software program. In an embodiment of a guard script language according to the present invention, the guard command has the following pseudocode syntax:

guard image_id.guard_id [level]
        [in storage_ranges]=guard_type
        (at invoc locations|in invoc ranges);

In an embodiment of a guard script language, a guard command of this syntax has the following arguments:

| | |
|---|---|
| image_id | The ID of a loaded image. |
| guard_id | The ID assigned to the injected guard. |
| level | The number of times the guard type protection is applied. The default is one. |
| in storage_ranges | The list of one or more ranges in the image where the guard processing engine is allowed to inject guard code. |
| guard_type | The type of guard to inject. |
| at invoc_locations | A list of one or more locations where code to invoke the guards may be injected. If multiple locations are specified, the invocation code will be injected in each location. |
| in invoc_ranges | A list of one or more locations ranges where code to invoke the guards may be injected. The invocation code of each guard will be injected in a locations selected randomly in the specified ranges. |

In an embodiment, each guard command must specify the image to which it pertains by using the image_id parameter. A user must also specify a unique ID (guard_id) for each injected guard. Thereafter, other guard script commands can refer to the entire collection of guards injected in an image by using the fully qualified name "image_id.guard_id".

The level parameter controls the number of sets of guards injected by the guard command. For anti-debug guards, the argument "level" means the exact number of guards to inject. For other guard types, "level" means the number of times the client ranges are guarded. For example, for checksum guards, a guard level of "2" means the same client ranges will be guarded twice, by two checksum guards, each of which checksums the client ranges once. In an implementation of this embodiment, the default guard level is "1."

By default, the guard processing engine places the guard code in a randomly selected portion of the unused space within a host software program image. A user may specify ranges in the image where the guard processing engine is allowed to inject the guards code using the storage_ranges parameter. However, guard code ordinarily may be invoked only from a location of at least six bytes in length. If the invocation location is shorter than this, the injection may fail and the guard processing engine may report an error.

If the guard type requires the protected_ranges parameter (such as a checksum, checksum-notify, or repair guard), it must be specified. If the guard type does not require this parameter (such as an anti-debug guard), it is not used. If the protected_ranges parameter is used with a guard type that does not support this parameter, or not supplied with a guard type that requires it, an embodiment of the guard processing engine may report an error. Regions of the host software program image that are writable during execution and that are not mapped by the image command or protected by the reserve command, will not be guarded and are skipped automatically by the guard processing engine, even if such regions are within the scope of the protected_ranges parameter.

Once installed, a group of guards injected by a guard command becomes a single entity, referred to by its guard_ID. The guard_ID can be used in the following ways:

As a range in a range command
    To access the following predefined member field of the guard_ID: image_id.guard_id.key. The value of this expression is the union of guard bytes (collected from each guard in a set) in the injected guard whose values are derived from the client code the guards protect.

The guard_type argument identifies the guard type injected by the guard command. Each guard type has a specified syntax that is used as the guard_type argument in a guard command. An anti-debug guard is injected using the syntax "anti-debug." The level parameter of the guard command inserting an guard of the anti-debug guard type specifies the exact number of guards to inject. When level is not specified, its default value is one.

In the following pseudocode example, the anti-debug guard named Jasoom.g102 consists of 50 individual anti-debug guards, each of which is invoked at a random location in the host software program image Jasoom:

guard Jasoom.g102 50=anti-debug in Jasoom;

A checksum guard is injected using the syntax "checksum protected_ranges." The argument "protected_ranges" identifies a list of one or more client ranges in the image to be protected. When a guard command specifies a checksum guard, the guard processing engine computes and stores a checksum of the host software program instructions specified by the guard command as the client range(s). The level parameter of the guard command specifies the number of guards to inject. The protected range in the compiled code will be protected by guard instances equal to the specified level. In an embodiment, when a level is not specified, its default value is one.

A checksum_notify guard is injected using the syntax "checksum_notify<"message">protected_ranges." The argument "message" denotes the message to be displayed to the user when the guard fires. The argument "protected_ranges" identifies a list of one or more client ranges in the image to be protected.

In an implementation, host software programs protected with checksum_notify guards use the Win32 MessageBox( )

library function. The dialog box displayed may have only the "OK" button available. The user must activate the "OK" button to continue. In an embodiment, the message itself may be limited to 99 characters, and may not contain an end-of-line character or a quote character (").

A repair guard may be injected with a guard command using the following syntax: "repair protected_ranges". The parameter "protected_ranges" defines the list of one or more client ranges in the image to be protected by the injected guard. The "level" parameter, when used with a guard command that is injecting a repair guard, specifies the number of times to guard the protected ranges. Each protected location in the host software program code will have a number of different guard instances equal to the specified level. The actual number of guards deployed at each level is determined by the engine. When level is not specified, its default value is one.

According to an embodiment of the present invention, a silent guard may be injected with a guard command using the following syntax:

silent<"variable name[:index]", value>

The parameters are:

| | |
|---|---|
| variable_name[:index] | The name of a host software program variable in C syntax. If the variable is an integer array, index is a zero-based index into the array. |
| value | A 32-bit integer number in decimal or hexadecimal notation. (For example, decimal number 530,776,252 written as 530776252 or 0x1FA300BC.) |

A silent guard may be injected with a guard command, according to an embodiment of the present invention. The level parameter of the guard command specifies the exact number of silent guards to inject. When level is not specified, its default value is one. When a guard command specifies a silent guard, the guard processing engine stores an operation involving the variable name and an internal form of the value specified by the silent guard. When the host software program is executed and a guard is invoked, the guard code examines the value currently assigned to the specified variable and compares it to a specified stored value. If these values do not match, the guard fires. If the guard does not fire, program execution continues normally. Note that it is possible to cause a silent guard to fire by setting the variable to the "wrong" value during execution. In an embodiment, the specified host software program variable must be global signed or unsigned, non-static, 32-bit integer variable. During host software program compilation, the variable name is exported in an object code file that is associated with the host software program source code and the memory map file. The name of the variable must uniquely identify an integer variable in the host software program. The silent guard selects any function or variable whose ranges in the map file contain the keywords in the list. For example, "_spectrum" specifies a static integer called "spectrum." If the name of the variable is not unique, or could also refer to a function, an error is returned by the guard processing engine. The optional index specifies the zero-based index into an integer array. If the silent guard accesses data outside the integer array, an error is reported.

A practitioner of the present invention must ensure the value of the specified variable contains the correct value every time before the silent guard is invoked. Any time a silent guard is invoked and the value of the variable is not the same as the specified value, the silent guard will fire.

Several exemplary pseudocode guard commands follow. In the first pseudocode example of a guard command, a guard called Pop.g1 is composed of a set of three checksum guards that protect the "main" function. Each location in the compiled code of that function will be protected with three checksum guards. The guards may be stored anywhere in the image named Pop. The parameters and settings are:

| Parameter | Setting |
|---|---|
| image_id.guard_id | Pop.g1 |
| Level | 3 |
| guard_type | checksum |
| protected_ranges | Pop.code("main") |
| invoc_ranges | Pop |

The resulting guard command according to this example is:
guard Pop.g1 3=checksum Pop.code ("main") in Pop;

In this next pseudocode example, the guard called XL.g2 is composed of a set of checksum-notify guards that protect the entire XL image. Each location in the compiled code will be protected with one checksum guard. The guards code will be invoked at location "WinMainCRTStartup." When the guards are invoked, and the stored and computed checksums do not match, a "Tampering detected" message box is displayed. The resulting guard command according to this example is:
guard XL.g2=checksum_notify<"Tampering detected"> XL at XL.label("WinMainCRTStartup");

In this next pseudocode example, the repair guard named Pop.g3 repairs the code in Authentication.obj when one or more guards at the previously defined location Pop.loc are invoked. The user should ensure the code at the Pop.loc location is executed prior to the execution of the repair guard code. The resulting guard command according to this example is:
guard Pop.g3=repair Pop.code("Authentication.obj") at Pop.loc;

In this next pseudocode example, the anti-debug guard named Crackle.g102 consists of 100 individual anti-debug guards, each of which is invoked at a random location in the host software program image called Crackle. The resulting guard command according to this example is:
guard Crackle.g102 100=anti-debug in Crackle;

In this next pseudocode example, guards are used to protect one another in an inter-locking manner. The anti-debug guard named Z.g5 consists of ten individual guards, which are invoked inside the "authenticate" host software program code. These guards are repaired by the repair guards named Z.g6, which are invoked inside the "init" host software program code. The "init" host software program code executes before the "authenticate" host software program code. Finally, two sets of checksum guards, Z.g7, verify the guard code named Z.g6 and the "authenticate" host software program code. The Z.g7 guards are invoked from locations randomly selected from the image named Z. The resulting guard commands according to this example are:
guard Z.g5 10=anti-debug in Z.code("authenticate");
guard Z.g6=repair Z.g5 in Z.code("init");
guard Z.g7 2=checksum Z.g6
+Z.code("authenticate")
in Z;

The next pseudocode example shows six groups of guards guarding Im.R and one another in a cyclic manner. For example, Im.g4 guards Im.g3 (except for Im.g3.key), which in turn guards Im.g2, which in turn guards Im.g1, which in turn guards Im.g4. Note that in order to achieve such a cyclic guarding, a set of empty areas named Im.g4_space is allocated ahead of time and immediately reserved for storing the code of Im.g4 later. Im.g4_space serves as a "guard holder" for the not-yet-injected Im.g4. Also note that Im.g3.key is excluded from the checksum; to avoid cyclic dependency among the guard keys. The resulting guard commands according to this example are:

range Im.g4_space=Im.empty(0x500);
    reserve Im.g4_space;
    guard Im.g1=checksum Im.g4_space at Im.11;
    guard Im.g5=checksum Im.g4_space+Im.R at Im.15;
    guard Im.g2=checksum Im.g1+Im.R at Im.12;
    guard Im.g3=checksum Im.g2+Im.g5 at Im.13;
    unreserve Im.g4_space;
    guard Im.g4 in Im.g4_space=checksum Im.g3
        Im.g3.key at Im.14;

The location guard script command defines a new location ID that refers to a set of locations in an image. The following syntax is used:

location image_id.location_id=locations;

The parameters of a location command are:

| | |
|---|---|
| image_id | The ID of a loaded image. |
| location_id | The ID of a defined location. |
| locations | A list of one or more locations within the image. |

Each location command specifies the image name, using the image_id parameter. A user also specifies a unique ID for the defined location. Other guard script commands can refer to the entire collection of locations by using the fully qualified name: "image_id.location_id"

During the protection process, the code at a physical address in the image may be moved or transformed repeatedly by the engine as it executes guard script commands. By assigning a location_ID to a set of locations, a user can reliably refer to those locations by name, regardless of the effects of the protection process on the image. A single location in an image can be referred to by any number of location IDs.

In this pseudocode example of a location command, two relative virtual addresses (RVA) are assigned the location ID "Park.spot." Each RVA must be aligned with some instructions or data blocks in the image. The location ID may be used by other guard script commands to refer to the two locations by name:

location Park.spot=Park:0x1000, Park:0x2000; This next pseudocode example shows multiple location IDs referring to the same locations. Note that the location named Park.loc3 refers to the Park.loc1 twice, once explicitly and once implicitly:
    location Park.loc1=Park:0x1000;
    location Park.loc2=Park.loc1, Park.label("main");
    location Park.loc3=Park.loc1, Park.loc2;

The location_type argument is used to specify a location in a guard script command. The following exemplary pseudocode syntax is used:

location_type::=image_id.location_id
        |image_id.location_tag
        |image_id: rva
        |image_id.label ("keyword"[, . . . ])
        |location_type, . . .

The parameters of a location_type argument according to this example are:

image_id The ID of a loaded image.
    location_id The ID of a defined location.
    location_tag The ID of a defined tag.

rva A 32-bit RVA value representing an arbitrary location in the image, relative to the base address of the executable when loaded into memory.
    label ("keyword" [, . . . ]) This function returns the starting locations of any function or object module whose name in the map file contains the keywords in the list.

The network command injects a coordinated network of one or more guards, where the detection action and response action of the guards are invoked in separate locations. The network command allows a user to combine multiple guards into a network that shares detection results making it difficult to analyze the guarded host software program. In an embodiment of a guard script language according to the present invention, the syntax of an exemplary network command according to the present invention is as follows:

network image_id.guard_id
        [$level_d$] [in storage_ranges]=
        [$level_1$] checksum protected_ranges
            (at inv_locations [, . . . ]|in inv_ranges) and
        [[$level_2$] hide_result
            (at inv_locations [, . . . ]|in inv_range) and]
        [$level_3$] test_result
            (at inv_locations [, . . . ]|in inv_ranges);

The parameters of this network command are:

| | |
|---|---|
| image_id | The ID of a loaded image. |
| guard_id | The ID assigned to the injected guard. |
| $level_d$ | The default number of times to repeat a checksum component injection, a hide_result component injection, and/or a test_result component injection. If one of the other level parameters is not specified, it defaults to this value. In an embodiment, the default $level_d$ value is 5. |
| in storage_ranges | The list set of one or more ranges in the image where the guard processing engine is allowed to inject guard code. |
| $level_1$ | The number of times the checksum operation is repeated. If this value is not specified, it defaults to the value of the $level_d$ parameter. |
| checksum | This parameter directs the network command to inject checksum guards. |
| protected_ranges | The list set of one or more client ranges in the image to be protected by the injected guards. |
| at inv_locations | A list of one or more executable locations where code to invoke guards code may be injected. If multiple locations are specified, the invocation guard code will be injected in each location. |
| in inv_ ranges | One or more ranges of the executable locations where the code to invoke guards code may be injected. The invocation code of each guard code will be injected in a locations selected randomly in the ranges. |
| $level_2$ | The number of hide _result operations to perform. If this value is not specified, it defaults to the value of the $level_d$ parameter. |
| hide _result | This parameter directs the network command to obfuscate a checksum result is to be evaluated by a test _result guard. This parameter is optional. |
| $level_3$ | The number of test _result operations to perform. If this value is not specified, it defaults to the value of the $level_d$ parameter. |
| test _result | This parameter specifies where the guard code that tests the stored result is invoked. |

The network command allows a practitioner to inject guards into a host software program. Recall that when a checksum guard injected by a guard command is invoked, it evaluates the protected code and immediately acts on the result. The network command allows a user to separate the checksum component and the action component, injecting each one as a separate component, and thereby making the connection between the evaluation and action of the guard more difficult to detect and analyze. In addition, the hide_result operation component can be used to conflate the results of multiple checksum components. When a hide_result component is invoked, it compares two checksum results and, if either indicates tampering has occurred, both are set to indicate tampering. This allows a test_result component to react to tampering detected by checksum components it is not directly associated with, making analysis even more difficult.

Because a practitioner using a network command has more control over the invocation of the individual components of a guard, it is important to carefully select the invocation locations of each component. To detect tampering, the invocation of test_result components during host software program execution should occur after hide_result components are invoked, which in turn should occur after the checksum components are invoked. If components are not invoked in the specific order at least once, the host software program execution may not detect tampering and could continue execution.

The network command enables guard components to be injected in loops or similar constructs where each component can occur before the other depending on program execution. As long as either all checksum components or all test_result components are invoked, a network guard guarantees detection.

The hide_result components increases the number of combinations of components that can occur in this order to increase the chance to detect tampering. It ties multiple checksum components and allows the creation of a randomized network of guards that provides a high probability of detecting tampering.

Each network command must specify a host software program image using the image_id parameter. A user must also specify a unique guard_ID for each network. Other guard script commands then can refer to the entire collection of guards code injected in an image by using the fully qualified name: "image_id.guard_id."

Each component of the network command has an associated level parameter, $level_1$, $level_2$, or $level_3$. The $level_d$ parameter allows a user to specify a default for the individual level parameters used by each component.

By default, the guard processing engine places guard code in a randomly selected portion of the unused space within a host software program image. A user also may specify ranges in the image where the guard processing engine is allowed to inject guards code using the storage_ranges parameter.

When the host software program is executed and a checksum component of the guard is invoked, the guard code computes a checksum of its client range and compares the computed value to the checksum stored during protection. The result of the comparison is saved for later use, when an instance of a test_result component is invoked.

The $level_1$ parameter allows a user to specify the exact number of checksum components to inject. If no value is specified, it defaults to the value of the $level_d$ parameter.

The required inv_locations or inv_ranges parameter specifies where the checksum component guard code is invoked.

The optional hide_result parameter injects guard components that link the results of multiple checksum components. When a specific hide_result guard is invoked, it selects a pair of checksum component results and, if either of the results indicate tampering, sets both to indicate tampering. The number of times the invoked hide_result guard performs this operation is controlled by the $level_2$ parameter.

The hide_result parameter may appear only once in a network command. If a user wishes to invoke a hide_result operation multiple times, the $level_2$ parameter is used. If no value is specified, it defaults to the value of the $level_d$ parameter. Each time an individual hide_result component performs this function, the checksum result examined is randomly selected from the entire list of checksum results. The required inv_location or inv_ranges parameters specify where the hide_result code is invoked.

The test_result component specifies when a specific checksum component result is examined. If the result stored when the checksum guard code was invoked indicates the stored and calculated checksums did not match, the test_result guard component fires. The actual number of test_result component guard instances deployed is determined by the guard processing engine. The $level_3$ parameter allows a user to specify the number of times the test_result code insertion operation is performed. If no value is specified, it defaults to the value of the $level_d$ parameter. The required inv_location or inv_ranges parameter specifies where the guard code that tests the stored result is invoked.

The following pseudocode network command example injects a checksum component that protects the "main" function of the host software program:

network I.net1=checksum I.code("main")
        in I.begin and
        test_result in I.end;

According to this example, the checksum components are invoked when the code associated with the I.begin marker executes. When the I.begin code is executed, the checksum operations are performed, and the results saved for later use. The test_result components are invoked when the code associated with the I.end marker is executed. When the I.end code is executed, the test_result operations are performed, examining the results saved by the checksum components. The ranges named I.begin and I.end would have been created earlier in the guard script. Note that modification of the protected range is detected when the code marked by I.begin is executed, but the response is deferred until the code marked by I.end is executed. This allows a guard to examine the protected code during one phase of program execution, and react to the results in another portion of the host software program.

The following exemplary net work command injects two checksum, four hide_result and eight test_result components in the ranges I.begin, I.middle, and I.end, respectively:

network I.net2=2 checksum I.guarded in I.begin and
        4 hide_result in I.middle and
        8 test_result in I.end;

Here, the hide_result component is used to randomize the links between the checksum and test_result components. Also, the number of each components has been specified individually.

The obfuscate guard script command scrambles the selected host software program instructions to other, equivalent instructions, while retaining the overall code semantics. The pseudocode syntax of an obfuscate guard script command in an embodiment of a guard script language according to the present invention is as follows:

obfuscate protected_ranges [level n];

The parameters of an obfuscate guard script command in this embodiment are:

| | |
|---|---|
| protected_ranges | The list of one or more ranges in the image to be scrambled by guard processing engine. |
| level n | An integer specifying the number of times to apply the obfuscation process. The default is one. |

The obfuscate command allows a user to specify a range of code that will be modified by the guard processing engine to be less recognizable to investigators. The scrambled appearance of the code does not affect the semantics of the underlying program, but the protected program is often significantly larger than the original. If the size of the program is important, a user should select only the most significant program ranges to obfuscate in this manner. An embodiment of the guard processing engine supports a set of obfuscating transformations which include the following:

breaking up basic blocks into smaller pieces and putting those pieces in discontinuous portions of the image (code shuffling);

inserting "garbage bytes" between the shuffled blocks;

converting randomly selected, common instructions to other, less obvious constructs; and/or inserting code executed when the host software program is run, but that does not affect the semantics of the host software program, making any disassembled code more difficult to analyze.

The obfuscate command can be applied to guards or ranges. Obfuscation preserves the relationship between an assigned ID and the corresponding code. An object referred to by name can be obfuscated an arbitrary number of times and still be identified by its ID within a guard script. However, the obfuscate command must be applied to a host software program range before any guards are applied to that range. Regions of the image that are not mapped by the image command, or that are protected by the reserve command (discussed hereinafter) will not be obfuscated and are skipped automatically by the guard processing engine. Obfuscating code to more than one level will further transform code that has already been obfuscated, including any code added by the obfuscations that have already been done, making the transformations themselves more difficult to detect.

A practitioner of the present invention should be aware that obfuscation cannot be applied to instructions that are modified at run-time (e.g., self-modifying code). The guard processing engine tries to detect self-modifying code automatically, but this detection may fail. The practitioner should use the reserve command to exclude any instructions modified at run-time from modification by the guard processing engine.

A practitioner of the present invention also should be aware that obfuscation generally results in smaller basic blocks in the image. The insertion of guards requires locations of at least six (6) bytes in length. Obfuscating a range often reduces the ability to inject guards in that range.

These example pseudocode commands obfuscates the executable code of the image "I":
    image I="foo.exe";
    obfuscate I;

These example pseudocode commands guard the obfuscated code and then obfuscate the guards as well:
    image I="foo.exe";
    obfuscate I.code("main");
    guard I.g=checksum I.code("main") in I;
    obfuscate I.g;

The random guard script command sets the seed of randomizing protection to a new value. In an implementation, its syntax is as follows:
    random seed;

The parameter "seed" is a 32-bit integer to be set as a randomization seed value. The guard processing engine uses the specified seed to generate variations in program transformations. When no random command is used, the guard processing engine uses the default value of one. Protecting a host software program multiple times using the same guard script but with different random seeds would result in copies of the protected host software programs having different binary contents. However, a user would not be able to detect that one copy of the protected host software program is different from another, as both copies would perform identically from the user's perspective.

The following pseudocode scripts result in two copies of a protected host software programs. Each copy functions identically to the other from the user's perspective, but the contents of the output files are different.
    image BFG="Quake.exe" out "q1.exe";
    random 13;
    obfuscate BFG;
    image Gib="Quake.exe" out "q2.exe";
    random 14;
    obfuscate Gib;

The range guard script command defines a new range_ID for a selected set of code. In an implementation, its syntax is:
    range image_id.range_id=range;
The parameters are:

| | |
|---|---|
| image_id | A loaded image. |
| range_id | The new ID of a defined range. |
| range | A range (or series of ranges) within the same image. |

Each range command must specify the image name, using the image_id parameter. A user must also specify a unique ID for the specified or group of ranges. Other guard script commands can refer to the entire collection of range(s) by using the fully qualified name: "image_id.range_id."

During the protection process, the code in a range in the image may be moved or transformed repeatedly by the engine as it executes guard script commands. By assigning a range ID to a set of ranges, you can reliably refer to those ranges by name, regardless of the effects of the protection process on the image. A single range in an image can be referred to by any number of range_IDs.

In the following pseudocode example, the two relative virtual addresses, 0x1000 and 0x1500, define a range of code assigned the range_ID "New.rope". The range ID may be used by other guard script commands to refer to this program code, regardless of any actions by the engine:
    range New.rope=New:[0x1000,0x1500);

The following pseudocode example shows multiple range IDs referring to several types of ranges:
    range Park.rng1=Park:[0x1000,0x1500);
    range Park.rng2=Park.rng1*Park.code("main");
    range Park.rng3=Park.rng1−Park.rng2;

In the following pseudocode example, three similar range expressions yield different results:
    # rng1=[0x1000,0x1003)
    range  Z.rng1=Z:[0x1000,0x1001)−Z:[0x1001,0x1003)+
        Z:[0x1000,0x1003);
    # rng2=[0x1000,0x1001)
    range  Z.rng2=Z:[0x1000,0x1001)+Z:[0x1000,0x1003)−
        Z:[0x1001,0x1003);
    # causes Z.rng3 to be empty
    range  Z.rng3=Z:[0x1000,0x1001)−(Z:[0x1001,0x1003)+
        Z:[0x1000,0x1003));

The range_type guard script command is used to specify a collection of ranges in a guard script command. A pseudocode example follows:
    range_type::=image_id
        |image_id.range_id
        |image_id.guard_id
        |image_id.guard_id.key
        |image_id.range_tag
        |image_id: [start_rva, end_rva)

|image_id.empty (number_of_bytes)
|image_id.code ("keyword"[, . . . ])
|range_type+range_type
|range_type−range_type
|range_type*range_type
|(range_type)

The parameters of this exemplary command are:

| | |
|---|---|
| image_id | The ID of a loaded image. |
| range_id | The ID of a defined set of ranges. |
| guard_id | The ID of a guard. |
| guard_id.key | The union of guard bytes (collected from each guard in the group of guards represented by the guard ID) whose values are derived from the target code the guards protect. For checksum or checksum-notify guards, the key is the bytes that store the original checksum values of the code the guards are supposed to check against. For repair guards, the key is the bytes used in repairing the target code. Anti-debug guards have a key containing no bytes because they have no target code to check. |
| range_tag | The ID of a defined tag. |
| start_rva, end_rva | An arbitrary RVA range that starts at start_rva and ends before end_rva. An RVA is a relative virtual address. This is 32-bit value representing an arbitrary location in the image, relative to the base address of the executable when loaded into memory. |
| empty (number of bytes) | This function allocates a set of empty areas in the image with a total size equal to the value of the bytes parameter. These areas are unused portions of the host software program that can be used to store new guard code, or code displaced or generated by other guard script commands. If the image already contains empty space, this function will allocate enough additional empty space to increase the total available only to the requested amount. This function will not increase the size of the image above the limit specified by the max_size parameter. |
| code ("keyword" [, . . . ]) | This function returns the code of any function or object module whose name in the map file contains the keywords in the list. This mechanism allows a source-level function or file to be identified at the binary level by pieces of its name. Each line of the map file corresponds to a code segment, and contains two case-sensitive names—the name of the object module in the "Lib:Object" column and the name of the function in the "Publics by Value" column. These two names allows a user to identify each code segment at the function or object module level. For example, I.code ("foo") would search the map file for lines where the string "foo" appears. Note this includes any partial match of the string, including "foo.obj," "foodstuff," and "barefoot." If a match is found, the function will refer to the locations in the image where the compiled code of the matched functions is stored. If the keyword refers explicitly to an object file with the same name linked to the executable, and no other line in the map file contains this string, the function will refer to the locations in the image where the compiled code from that object module is stored. If a code segment is not physically present in the executable, it will not be returned by this function, even if the code segment's name appears in the map file. |
| range_type + range_type | The code resulting from the union of the ranges. |
| range_type − range_type | The code resulting from the first expression subtracted by the set resulted from the second. |
| range_type * range_type | The code resulting from the intersection of the two sets of ranges. |
| ( range_type) | Parentheses are used to establish precedence when grouping ranges used with other operators. |

The range_type guard script command defines the scope of the host software program code selection. The order of the expression evaluation follows that of traditional arithmetic operations except that the '+', '−', and '*' operators have the same precedence. For example, A−B+C, A+C−B, and A−(B+C) may all yield different results. After the evaluation, the resulting ranges are mapped to the actual code in the host software program image. If any part of a range does not lie within the image or fully cover any host software program instruction or data block, that part of the range will not be mapped to any actual code. Note that the selected code must all reside in the same image in which the range ID is defined.

The reserve guard script command identifies code that will be not be modified by the guard injection process. In an implementation, its syntax is:

reserve range_type;

The parameter "range_type" identifies one or more ranges within the same host software program image.

The reserve guard script command prevents the specified ranges of the host software program code from being modified or transformed by the guard processing engine. A typical use of this command is to prevent performance-sensitive code from being obfuscated. Any or all of the reserved code can be unreserved at a later point in the guard script with the unreserve command.

The following pseudocode example reserves ranges of a host software program that contain computation-intensive code before obfuscation:

image IT="Quake.exe";
reserve IT.code("draw")+IT.code("surface");
obfuscate IT;

The unreserve guard script command removes any restrictions on a range imposed by any reserve commands applied at an earlier time. The syntax is:

unreserve range_type;

The parameter range_type defines a range (or series of ranges) within the same image. The unreserve command removes the restrictions of any earlier use of the reserve command. This allows the guard processing engine to modify code in the specified range. This command only affects code in the range_type that has been previously reserved. Any or all of the unreserved code can be reserved later by another use of the reserve command.

The present invention comprises "markers" that optionally may be used to identify sections of host software program source code, so that they can be identified later for use in a guard script. A user can place a marker in the source code of a host software program to assign a name (or group of names) to the compiled code generated from that source code. A user can use these names in guard scripts to control the protection is assigned to the named code.

In an embodiment, the present invention comprises two types of markers:

"Location" markers that assigns one or more names to a single address in the compiled host software program.

"Range" markers assigns one or more names to a range of addresses in the compiled host software program.

Each marker begins with a string that a compiler of the host software program interprets as a single-line comment. These comments may be preceded by white space, but no host software program source code may be on the same line as the comment containing a marker. A pseudocode example is:

//@@: location Alpha

If there is host software program source code on the same line as a marker, the guard processing engine will report an error. The reasons for this include:

Placing a marker on a line by itself makes it clear which line of code is referred to by the marker.

Placing a marker on a line by itself ensures that the marker is not part of a quoted string.

A "tag" is an optional name for set of markers. It identifies markers of the same type as being part of a collection. A tag is a shared name. It can be used to group together multiple markers that have a common property, or require similar protection. The set of markers then can be referred in a single guard script by the tag name. To refer to a tag in a guard script, the fully qualified notation, e.g., "image_ID.tag_name," is used.

A tag may not be used more than once in a marker. Thus, the following pseudocode example would cause the guard processing engine to report an error, because the tag Delta is used two times:

//@@: location Coal Delta Eagle Delta

Each marker must be assigned a unique ID and may be assigned additional shared tags. A tag may be used for multiple markers of the same type. This provides a convenient way to refer to a group of markers in guard script commands. In an embodiment of the present invention, the following rules apply to markers and tags:

A marker ID or tag is composed of case-sensitive letters, numbers, and underscore characters. ([a-zA-Z0-9_])

A marker ID or tag may not begin with a number.

A tag may be used in any number of markers, but each tag ID must be distinct from any other tag or ID used anywhere in an application.

A specific tag can only be used with one type of marker. For example, if "Zeta" is used as a range marker tag, it may not be used for an ID or a location marker tag.

A marker ID or tag may not contain any strings that are reserved for other uses in the embodiment of the guard script language. In an embodiment, such reserved strings include the following: and, at, code, dir, empty, guard, image, in, key, label, level, location, network, obfuscate, out, random, range, reserve, size, unreserved.

The location marker identifies a single location in the source code that can be used in a guard script. In an embodiment, its syntax is:

//@@: location ID [tag . . . ]

The parameters in this embodiment are:

ID A unique name assigned to the location.

tag A shared tag name. An optional name for the same location. The same tag can be shared by multiple location markers.

This marker assigns a unique ID and an optional list of tags to a specific location in the application source code. All of these names can be used in guard scripts to reference the beginning address of the compiled code associated with this location. To refer to a location named by this marker in a guard script, use the fully qualified notation: the image ID of the application, followed by a period ("."), followed by the location ID or tag, e.g. "image_ID.tag".

The ID identifies the location uniquely, but a tag identifies the collection of locations that share the same tag. The location marker can be added to any type of host software program source or header file. Each marker can be inserted between any two statements in a host software program source file. The marker then is mapped to its corresponding program address by the guard processing engine according to the following rules according to an embodiment of the present invention:

The ID and any tags of a location marker are always mapped to the beginning address of the nearest compiled code that follows the marker. The ID and tags are aliases for the same address.

If no compiled code follows the marker, the marker refers to a null location that does not correspond to any address. A null location is a valid location but cannot be used for inserting guards.

Multiple location markers from different source lines can be mapped to the same address, if that address is the nearest address to each marker. These markers are also aliases of each other.

No relative ordering exists among aliases that refer to the same address, regardless of the order they appear in the source file. For example, if two location markers next to each other are mapped to the same address, then the mapping is equivalent to the mapping resulting by reversing the order of the marker lines.

In a guard script, a fully qualified location ID or tag can be used to refer to the address of the associated compiled code throughout the protection process. For example, if the compiled host software program code associated with the location name is relocated, the location name will automatically refer to the address of the relocated code. An ID or tag created with a location marker can be used in the same way an ID created with the guard script location command is used.

The following pseudocode example defines three locations: "Alpha," "Blue," and "Coal" in the host software source code. Note that location "Alpha" has only a unique ID, but locations "Blue" and "Coal" also have the optional tag "Delta" specified.

```
//@@: location Alpha
if (I>0)
{
    //@@: location Blue Delta}
...
else
{
    //@@: location Coal Delta
...
}
```

In the following pseudocode example, the guard script uses the location IDs and tags specified above to invoke guards at these locations. The first checksum guard is assigned to the location with the ID "Alpha" by name, but an anti-debug guard is assigned to each of the "Blue" and "Coal" locations by using the tag they share.

```
Image I="pgm.exe";
guard I.g1=checksum I at I.Alpha;
guard I.g2=antidebug at I.Delta;
```

The following two pseudocode examples illustrate that there is no relative ordering among location marker lines that point to the same address.

```
//@@: location Blue
//my comment line here
//@@: location Coal
a=a+b;
```

In the above example, the two markers "Blue" and "Coal" are mapped to the same address, namely the beginning address of the compiled code of "a=a+b." There is no compiled code generated for the commented line between them. The following pseudocode example results in the same mapping even if the marker ordering is reversed.

```
//@@: location Coal
//my comment line here
//@@: location Blue
a=a+b;
```

A range marker identifies a range of source code that can be used in a guard script. In an embodiment, its syntax is:
//@@: range ID [tag . . . ] {
//@@:} ID
The parameters in this embodiment are:

| ID | A unique name assigned to the range. |
|---|---|
| tag | A shared tag name. |

This marker assigns a unique ID and an optional list of tags to a range of lines in the host software program source code. All of these names can be used in guard scripts to reference the compiled code (if any) associated with the source code contained between the initial and final range marker lines. To refer to a range named by this marker in a guard script, use the fully qualified notation: the image ID of the application, followed by a period ("."), followed by the range ID or tag.

The range marker can be added to any type of source or header file in the project. The initial and final lines of the marker are individual lines, and can encapsulate any statements in a source file. The initial line must come before the final line, and the lines cannot be split between two source files. To mark multiple source ranges, multiple markers that share the same tag are used. The range marker may contain other range markers, or be included partially in another range marker.

In an embodiment, the guard processing engine maps a range marker to its associated compiled code according to the following rules:
- The ID and any tags of a range marker are always mapped to the compiled code that corresponds to the source code between the marker lines. The ID and tags are aliases for the same compiled code.
- If no compiled code is generated for the source code between the marker lines, the marker corresponds to a null range of zero size. A null range is a valid range but cannot be obfuscated nor guarded.
- Multiple range markers that share some overlapped source code can be mapped to the same compiled code, if the source code contained by each marker is translated to the same compiled code. These markers are also aliases of each other.
- No relative ordering exists among the marker lines that refer to the same compiled code, regardless of the order they appear in the source file. For example, if the initial lines of two range markers are placed next to each other, then the mapping is equivalent to the mapping resulted by reversing the order of those lines.

In a guard script, a fully qualified range ID or tag can be used to refer to the associated compiled code throughout the protection process. For example, if the compiled code associated with the range name is obfuscated, the range name will automatically refer to the obfuscated code.

An ID or tag created with a range marker can be used in the same way an ID created with the guard script range command is used.

The following pseudocode example defines three ranges in the source code: "Rock," "Paper," and "Scissors." Note that part of the range named "Paper" is contained in both the range named "Rock" and the range named "Scissors." The "Rock" and "Scissors" range markers also are assigned a shared tag called "hammer."
//@@: range Rock hammer {
int foo( )
{
//@@: range Paper {
return 5;
}
//@@:} Rock
//@@: range Scissors hammer {
void bar ( )
{
//@@:} Paper
. . .
}
//@@:} Scissors This following pseudocode guard script uses the range IDs and tags specified above. The checksum guard is assigned to protect both the Rock and Scissors ranges by using the optional tag they share. The anti-debug guard is invoked at a location within range the Paper range.
image I="pgm.exe";
guard I.g1=checksum I.hammer in I;
guard I.g2=antidebug in I.Paper;

The two following pseudocode examples illustrate that there is no relative ordering among range marker lines that point to the code.
//@@: range Alpha
//@@: range Beta
a=a+b;
//@@:} Alpha
//@@:} Beta The above range markers map to the same code, namely the compiled code of "a=a+b". Note that the markers in the following script achieve the same mapping.
//@@: range Beta
//@@: range Alpha
a=a+b;
//@@:} Beta
//@@:} Alpha If either the initial or final line of a range marker is missing, the guard processing engine will report an error. If both the initial and final lines of a range marker do not have an identical ID, the guard processing engine will report an error.

Figure 5:
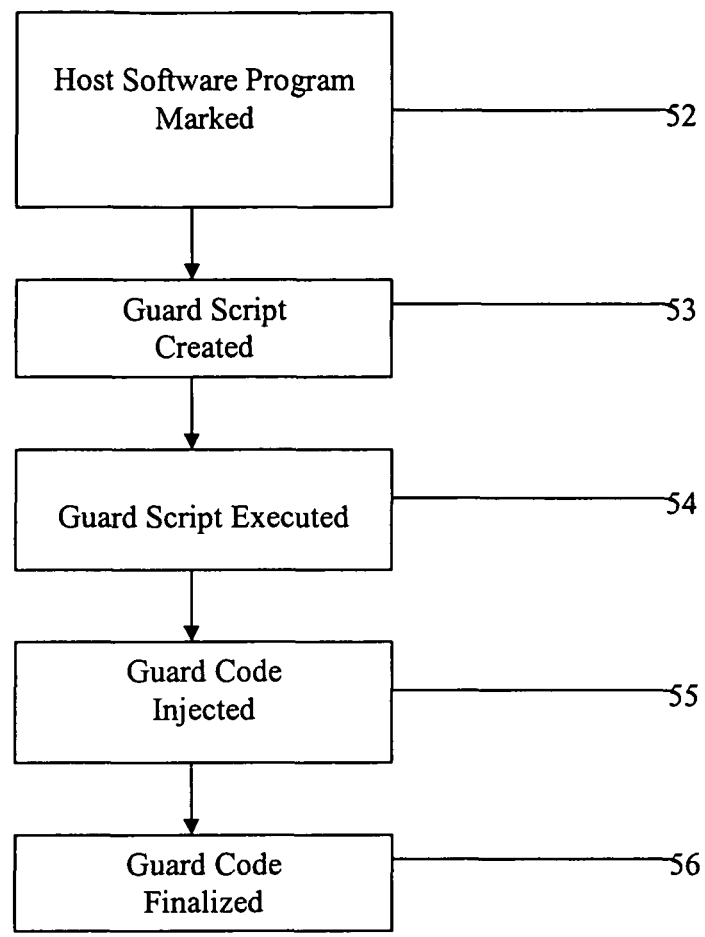
FIG. 5 shows a flow chart illustrating an embodiment of a method for inserting a guard into a host software program according to the present invention.

Referring now to FIG. 5, there is shown a flow chart illustrating an embodiment of a method according to the present invention for inserting a guard into a host software program. In the step shown as block 52 of FIG. 5, the host software program is marked. This marking step comprises the steps of inserting markers into the host software program source code, as discussed herein. The markers identify, for example, the location(s) of guards to be injected into the host software program, the range(s) of the host software program to be protected by each guard, and the portions of the host software program that will not be protected by guards.

In the step shown as block 53 of FIG. 5, a guard script is created. According to the present invention, a guard script may be created by coding the guard script commands individually using, for example, a text editor. In an embodiment, the present invention comprises an automated guard script creation tool. According to this embodiment, the automated guard script creation tool is operable to analyze markers that are inserted into the source code of a host software program. A guard script is automatically generated based on the automated guard script creation tool's analysis of the markers. In an embodiment, a guard injection computer program of the present invention may comprise a graphical user interface ("GUI") into which an automated guard script creation tool may be incorporated, or for which an automated guard script creation tool may be adapted for use. In an embodiment, an automated guard script creation tool may be incorporated into a software program development tool such as Microsoft Visual Studio or another software program development tool comprising a GUI. In this embodiment, the automated guard script creation tool is adapted for use with a GUI.

In the step shown as block 54 of FIG. 5, the guard script is executed by the guard injection computer program of the present invention. As the guards script commands are executed, guards are injected into the host software program in accordance with the interpretation of the guard script. For each guard that will be injected, a guard template is retrieved from a guard library. The guard injection computer program determines information such as, for example, the location of the guard template in the guard library, how to parameterize the guard template, and whether the guard template has a key area and, if so, where the key area is within the guard template.

In the step shown as block 55 of FIG. 5, the guard template's guard code is injected into the host software program. The injected guard code then is patched with values, such as, for example, address(es) of the client range(s). If the guard comprises a key, the key value is not computed or patched to the code until the guard finalization step (discussed hereinafter).

In the step shown as block 56 in FIG. 5, the guard is finalized. The guard finalization procedure is performed at the end of all host software program transformations, after all guards are injected and any code obfuscation is performed. The guard finalization step completes the injection of each guard by computing the value of the guard key and patching it into the guard code. Note that if a first guard's client range contains a second guard's key, the second guard's key must already have been computed and patched. This is to make sure that the first guard's key is derived from client range code that does not change at a later time in the guard finalization step.

Figure 6:
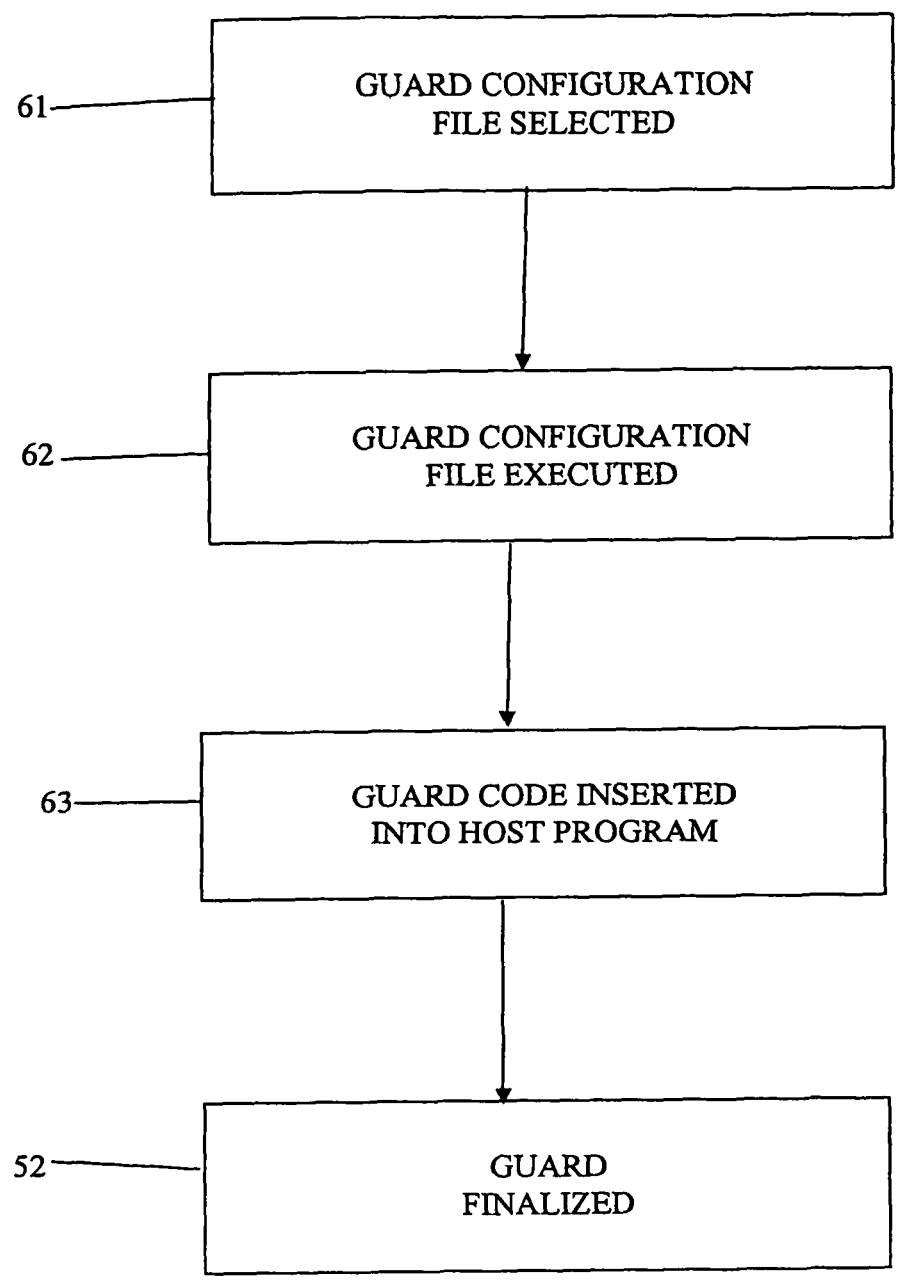
FIG. 6 shows a flow chart illustrating an embodiment of a method for inserting a guard into a host software program according to the present invention.

According to an embodiment of the present invention, the guard injection step for each guard (shown as block 55 in FIG. 5) may be described as comprising three component steps, as shown in FIG. 6. In the step shown as block 61 of FIG. 6, for each guard that will be injected, a guard configuration file pertaining to that guard is selected from the guard library. In this step, guard processing engine first retrieves and executes the guard type file that is appropriate for the guard type to be injected. Execution of the selected guard type file provides a guard processing engine with information identifying the guard configuration file to be selected from guard library.

In the step shown as block 62 of FIG. 6, the selected guard configuration file's computer instructions are executed by the guard processing engine. The guard configuration file's computer instructions comprise information such as, for example, the location of the guard template in the guard library, how to parameterize the guard template, and whether the guard template has a key area and, if so, where the key area is within the guard template.

In the step shown as block 63 of FIG. 6, the guard code is injected into the software program by the execution of the guard configuration file. When executing the guard configuration file, guard processing engine 45 creates a copy of the guard code from its guard template, and injects the copied guard code into the host software program. The injected guard code then is patched with values initiated by the guard configuration file or guard processing engine 45, such as, for example, address(es) of the client range(s). However, if the guard comprises a key, the key value is not computed or patched to the code until the guard finalization step.

In an embodiment, guard script 43 comprises one or more guard commands. When executing each guard command in guard script 43, the guard processing engine according to this embodiment of the present invention performs the following steps:

1. Guard script interpreter 44 interprets the arguments from each guard command.
2. If a guard command gives a set of requested client ranges, guard processing engine 45 selects the subset of them that can be guarded.
3. For each specified guard level, guard processing engine 45 injects one or more guards necessary to achieve the desired level of protection. Guard processing engine 45 repeats following process when injecting each guard:
   (a) Loads the guard type file of the requested guard type into computer memory (if it has not yet been loaded).
   (b) Selects a guard configuration file from the guard type file.
   (c) If the guard is designed to protect client code, assigns at least one client range to the guard.
   (d) Analyzes the host software program image and select appropriate areas (which, if possible, are empty spaces in the image) for storing the guard code.
   (e) Selects a location to invoke the guard.
   (f) Executes the selected guard configuration file to inject the guard into the host software program.

In the event an error is encountered during the foregoing process, guard processing engine 45 will terminate the process.

The client ranges requested for protection by the user are not always the client ranges that are guarded. A guard injection computer program according to an embodiment of the present invention automatically filters out bytes from the client ranges that are not read-only at run-time (i.e., bytes that are not static during host software program execution). Such bytes cannot be guarded. The remaining "guardable ranges" can include both program instructions and data. If there is no guardable byte left after the filtering process, a guard injection computer program according to an embodiment of the present invention may terminate the process and print an error message notifying the user that the requested client ranges do not contain guardable bytes. Note that anti-debug guards do not have client ranges, so the filtering operation does not apply to this guard type.

For repair guards, the client ranges are further restricted. The first 1K bytes of the host software program is always excluded from guarding, because this range normally is write-protected and any repair action on the host software program code within this range may result in an error during execution of the host software program.

By default, a guard injection computer program according to an embodiment of the present invention assumes all program instruction bytes are static and, thus, guardable. However, if a guard injection computer program according to an embodiment of the present invention finds an instruction that potentially is modifiable at run-time (such as, for example, where another instruction may possibly write it as data), then that instruction will be considered writeable and, thus, not guardable. Nevertheless, there is no guarantee that a guard injection computer program according to an embodiment of the present invention can find all such writeable instructions. Therefore, the guard processing engine of the present invention permits known writeable instructions to be manually marked to exclude them from the client ranges to be guarded.

By default, a guard injection computer program according to an embodiment of the present invention assumes all data bytes in a program are not static. However, the data bytes within a guard are treated as read-only if they are marked as such in the guard template or if their uses are understood by a guard injection computer program according to an embodiment of the present invention to be read-only.

As noted previously, a guard level according to the present invention means the number of times guard protection is applied to a client range. For anti-debug guards, a guard level means the actual number of guards to inject. For other guard types such as checksum or repair guards, a guard level means the number of times the guardable ranges will be checksummed or repaired, respectively. The motivation for having multiple levels of protection is redundancy in protection. For example, a first level of checksum guards may compute the checksum of the client range in one way, and a second level of guards may compute the checksum of the same client range in a different way. The combined checksum algorithms increase the probability of detecting code modifications that might have escaped detection by a single checksum algorithm.

Each level of guarding requires at least one guard. If a guard is multi-ranged, it can usually guard all requested client ranges. When a guard is single-ranged, it can guard only a limited portion of the client ranges, and more guards need to be injected to complete the coverage of all client ranges. For each guard type, the guard type file comprises information about how many ranges a particular guard can handle, and how large each range can be. The present invention then assigns client ranges to guards accordingly.

Depending on whether the guard is a multi-range guard or a single-range guard, a guard injection computer program according to an embodiment of the present invention assigns client ranges to the guard in different ways. Multi-range guards expect a guard injection computer program according to an embodiment of the present invention to provide to them a set of client ranges to protect. In response, a guard injection computer program according to an embodiment of the present invention allocates program memory for each guard, storing in the memory a table of addresses that point to the client code ranges. The guard accesses the client ranges at run-time via this address table.

Figure 7:
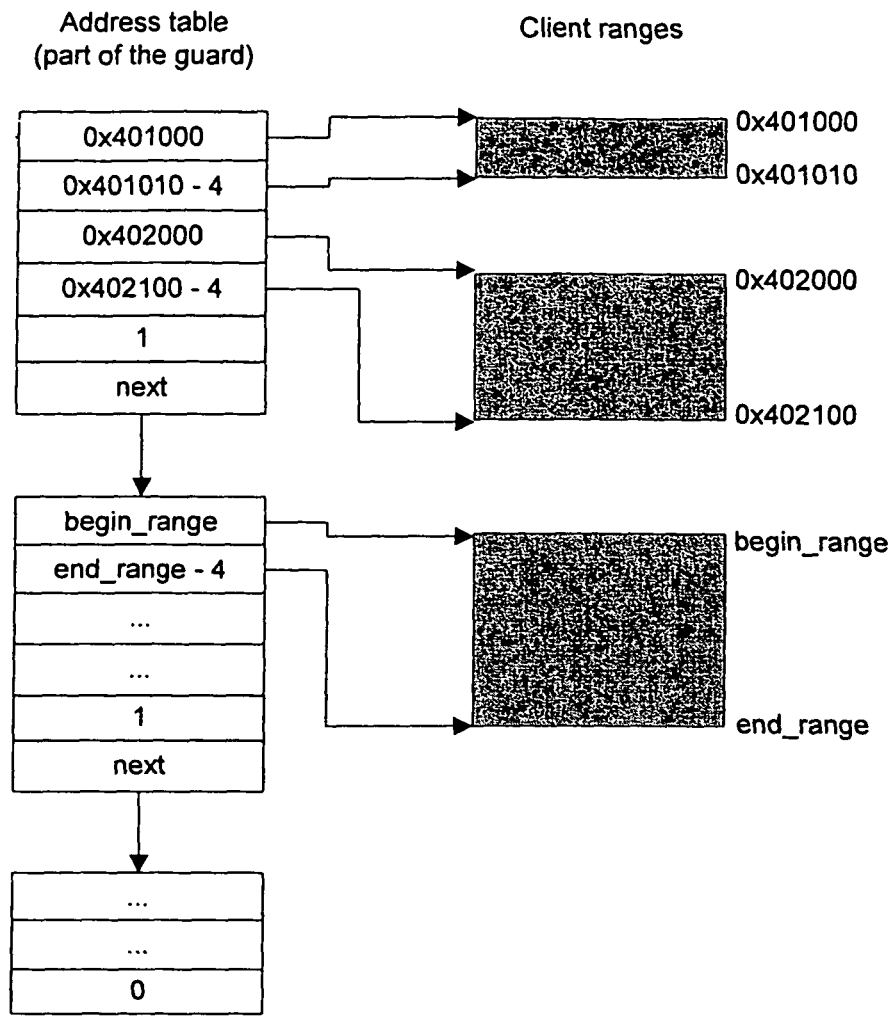
FIG. 7 shows an exemplary address table for a multi-range guard according to an embodiment of the present invention.

FIG. 7 shows an exemplary address table for a multi-range guard. The address table shown in FIG. 7 is a linked list. Each node in the linked list contains one or more pairs of addresses that point to one or more client ranges. The first (absolute) address of a pair is the beginning address of a client range. The second (absolute) address of a pair is the ending address of the client range. If a beginning address is 1, it means the node ends. The next address points to the address of another node in the linked list. If a beginning address is 0, it means the table ends.

In an embodiment, the table is allocated using a best-fit algorithm, so a node can be as large as the table itself. Other allocations algorithms are within the scope of the present invention. The address table is considered as a static part of the guard. As shown in FIG. 7, the guard configuration file symbol called "clientList" points to the beginning address of the address table. This symbol will be linked to the guard code (via the guard configuration file "PATCH" command), so the guard can access client range addresses in the client range address table.

In addition to the client range address table, a guard injection computer program according to an embodiment of the present invention also allocates a second address table that references the same client ranges. This second address table is used by a guard injection computer program according to an embodiment of the present invention for computing the guard key during the guard finalization step. This second address table is not part of the guard and is not part of the guard code injected into the host software program. The second address table uses the same format as shown in FIG. 7, except that the absolute addresses for the client ranges are replaced with RVAs. The second address table is pointed to by another guard configuration file symbol called "rvaList".

For guards whose "client_ranges" argument in the guard type file guard entry has a non-zero value, a guard injection computer program according to an embodiment of the present invention relies on the guard template to provide storage space for the client range addresses. In order to supply to the guard template with the addresses of the client ranges to protect, a guard injection computer program according to an embodiment of the present invention creates a special set of guard configuration file symbol pairs that carry the address values. For example, if the guard can support N client ranges, then a guard injection computer program according to an embodiment of the present invention initializes N pairs of addresses, as follows:

"clientRVA0", "clientLen0"
"clientRVA1", "clientLen1"
. . .
"clientRVAN−1", clientLenN−1"

where each pair of "clientRVAi" and "clientLeni" identify the beginning RVA and byte length of the i-th client range. The values of these symbols then are patched to the guard via guard configuration file PATCH commands.

Optionally, a guard command can specify whether to confine the storage space for the guards. If the "in storage_ranges" option is provided in the guard command, the guard code will be confined to the empty areas available in the given storage ranges. Otherwise, a guard injection computer program according to an embodiment of the present invention assumes the guard code can be stored anywhere (i.e., any empty areas available) in the host software program. In the first case where a storage range is specified, if there is not enough space in the specified storage ranges, the guard injection fails and a guard injection computer program according to an embodiment of the present invention gives an error message. In the second case where no storage range is specified, if the host software program runs out of space, it can create new space by appending guard code to the end of the program. However, if appending guard code to the end of the program results in the total program size exceeding the maximum program size limit (specified in the image command), the guard injection fails and guard processing engine 45 gives an error message.

Not all empty areas in a host software program are valid for inserting guards. For example, guards cannot be injected into areas that are reserved by the reserve command. The area into which a guard is injected cannot be already guarded (directly or indirectly) because inserting the guard there may cause a undesired cycle in the guard protection. In this context, "indirectly" means that if guard G1 protects guard G2, and guard G2 protects client range R, then guard G1 indirectly protects client range R. The area into which a guard is injected cannot be smaller that the size specified by the "min_size" argument in the guard type file entry.

When given a list of guard invocation locations from a guard command, a guard injection computer program according to an embodiment of the present invention uses them to invoke the guards. Each invocation location has to satisfy a list of requirements. First, the invocation location must be executable, i.e., it must be located within a basic block. The hook site (i.e., the instructions between the invocation location and the rest of the basic block) must be modifiable. The hook site cannot be in a "fixed" or reserved state. The total size of the hook site must be greater than six bytes, because at least six bytes are necessary to store a PUSH instruction (one byte) and a JUMP instruction (five bytes). The hook site must be stack-safe, i.e., any new PUSH operations done to the stack right before the hook site will not corrupt the stack. If the "register-flags" argument is set in the guard type file entry, the particular register_flags requirements must be met at that invocation location.

If the guard command supplies a set of invocation ranges (instead of specific invocation locations), a guard injection computer program according to an embodiment of the present invention will invoke the guard at a valid invocation location within the invocation ranges.

Referring back to the discussion of FIG. 6, to inject a guard, guard processing engine 45 executes the selected guard configuration file. If the guard configuration file is encrypted, guard processing engine 45 first decrypts the guard configuration file in memory before it executes its commands. A guard configuration file according to the present invention comprises computer instructions that:

Specify the guard template file to be used by guard processing engine 45;
Specify to the guard template the client range (if any) to protect;
Specify to guard processing engine 45 the location of the guard key (if it exists);
Specify the computations needed to calculate the guard key; and
Parameterize the guard template with the appropriate values including, for example, the addresses of the client code and the computed guard key value.

Because the computation of guard keys is postponed until the guard finalization, the guard configuration file will be executed twice by guard processing engine 45. On the first pass, the guard configuration file commands that are related to guard key computations are ignored by guard processing engine 45. On the second pass, the previously ignored guard key computation commands are executed. The combination of the two execution rounds completes the guard injection.

Consider the following guard configuration file example that injects a multi-range checksum guard. The pseudocode commands designated by "*" are executed by guard processing engine 45 on the first pass, while the pseudocode commands designated by "#" are skipped.

```
* TEMPLATE  guard.obj        CLIENT clientList 4 : _cksum 4
* SYMBOL    _key       4 =   ANY_NUMBER
* SYMBOL    _array_    4 =   rvaList
# SYMBOL    _base      4 =   IMAGE_BASE_WHEN_LOADED
* SYMBOL    _shift     4 =   RANDOM 1 31 1
* PATCH     _array_          FUNCTION chksm.obj
# PATCH     _base            FUNCTION chksm.obj
* PATCH     _key             FUNCTION chksm.obj
* PATCH     _shift           FUNCTION chksm.obj
# SYMBOL    _cksum     4 =   FUNCTION chksm.obj OF _key _array_
                                 _base _shift_
* SYMBOL    _array     4 =   clientList
* SYMBOL    _anybb     4 =   ANY_BB_ADDRESS
* SYMBOL    _fixups    4 =   FIXUPBASE
* PATCH     _anybb           TEMPLATE
* PATCH     _array           TEMPLATE
# PATCH     _cksum           TEMPLATE
* PATCH     _key             TEMPLATE
* PATCH     _shift           TEMPLATE
* PATCH     _fixups          TEMPLATE
* PATCH     _fixup1          TEMPLATE
* PATCH     _fixup2          TEMPLATE
* PATCH     _fixup3          TEMPLATE
```

The "TEMPLATE" instruction indicates the guard template file to inject (guard.obj). Guard processing engine 45 creates a copy of the guard template code in computer memory, and injects the copy into the host software program. The "TEMPLATE" instruction further declares the following to guard processing engine 45:

The guard is intended to protect a client range "CLIENT" assigned by guard processing engine 45. The address table of the client range is pointed to by pre-initialized symbol "clientList", which represents a four byte value.

The guard has a key. The key is found within the range beginning with the label "_cksum" within the guard, and is 4 bytes long.

The instruction "SYMBOL _key 4=ANY_NUMBER" defines a new symbol called "_key," which has a four byte, random value. "ANY_NUMBER" is a special symbol that represents a randomized 32-bit value. Thus, the symbol "_key" is assigned a randomized 32-bit value.

The instruction "SYMBOL _array_ 4=rvaList" defines another new symbol called "_array_." "_array_" is assigned the 32-bit value of the symbol "rvaList," which is a special symbol that points to the RVA table of the client ranges (i.e., the second address table that is used during the guard key computation).

The instruction "SYMBOL _shift 4=RANDOM 1 31 1" defines another new symbol "_shift" that is assigned a randomly selected 32-bit prime number. "RANDOM" is a special function that returns a prime or non-prime number between a given value range.

Note that the instruction "SYMBOL base 4=IMAGE_BASE_WHEN_LOADED" is skipped for the time being, because the symbol "IMAGE_BASE_WHEN_LOADED" is not defined until guard finalization.

The next three executed "PATCH" instructions parameterize an external object code function called "chksm.obj". This function is first loaded into guard processing engine 45. The chksm.obj function has internal labels "_array_," "_key," and "_shift" that are patched by guard processing engine 45 with the values of symbols "_array_," "_key," and "_shift," respectively, that were previously assigned by execution of the SYMBOL commands. The instruction "PATCH_base FUNCTION chksm.obj" is skipped, because the symbol "_base" is not yet defined.

The instruction "SYMBOL _cksum 4=FUNCTION chksm.obj OF _key _array_—shift array_—base" is skipped because the symbol "_base" is not yet defined. In this embodiment of the present invention, the "OF . . . " syntax forces dependency of the object code upon the symbols that follows which, in this case, are "_key," "_array_," "_base," and "_shift."

The instruction "SYMBOL _array 4=clientList" defines a symbol called "_array" that contains a 32-bit address that points to the same address as "clientList," i.e., the first address in the linked list of the client range information that is patched to the guard.

The instruction "SYMBOL _anybb 4=ANY_BB_ADDRESS" defines a symbol called "_anybb" that contains a 32-bit address of a randomly selected basic block.

The instruction "SYMBOL _fixups 4=FIXUPBASE" defines a symbol called "_fixups" that contains a 32-bit address pointing to the area where fix-up variables are stored.

The remaining "PATCH" instructions patch the values of the defined symbols into the guard template. Note that the "_cksum" symbol is not yet patched because it is not yet defined. The "_fixupk" symbols are special symbols that are pre-defined by guard processing engine 45. These symbols have the correct values of the fix-up variables that will be used by the guard at run-time.

After a guard has been injected into the host software program, it will be added to the group of guards that are injected by the same guard command. At this time, guard processing engine 45 also verifies that new guard introduces no guard cycles.

Figure 8:
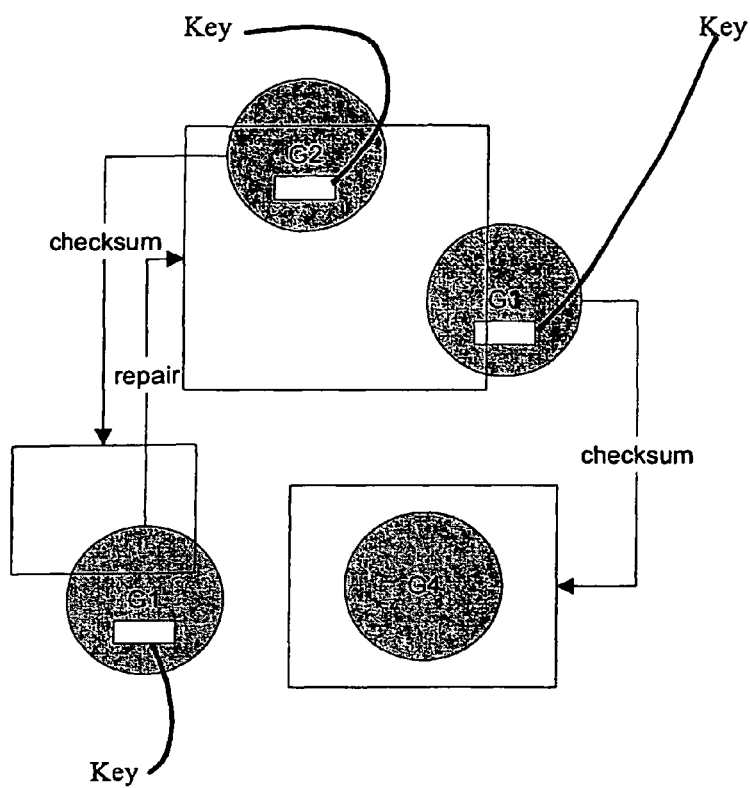
FIG. 8 shows a schematic block diagram illustrating the relationship between guards and guard keys according to an embodiment of the present invention.

Referring back to the discussion of FIG. 6, the guard finalization process completes the injection of each guard by computing and patching the guard key into the guard. Because guards may guard one another, the respective guard keys have to be computed and patched in an order that is consistent with their dependency relationship (if any). If a first guard's client ranges contain at least one byte of a second guard's key, then the second guard's key must be computed before the first guard's key. This ordering is to assure that before a guard's key is computed, the guard's client ranges have been finalized. For example, as shown in FIG. 8, the keys of guards G2 and G3 must be computed before the key of guard G1. Guard G4 in FIG. 8 represents an anti-debug guard and does not have a key.

To compute the key of a guard, in an embodiment of the present invention, guard processing engine 45 executes the guard configuration file again, but this time executes the instructions that were previously skipped. The guard configuration file is executed a second time even if there were no instructions skipped during the first execution, i.e., even if there are no keys to patch.

Before executing the guard configuration file a second time, guard processing engine 45 loads the host software program into computer memory, as if the software program were about to be executed by the computer. This step creates a run-time image of the software program from which the guard key is to be derived. This run-time image is saved to a temporary file that will be deleted as soon as execution of the guard configuration file finishes.

Referring back to the guard configuration file pseudocode provided above, on the second pass the pseudocode commands designated by "#" are executed by guard processing engine 45, while the pseudocode commands designated by "*" are skipped:

```
* TEMPLATE  guard.obj          CLIENT clientList 4 : _cksum 4
* SYMBOL    _key        4 =    ANY_NUMBER
* SYMBOL    _array_     4 =    rvaList
# SYMBOL    _base       4 =    IMAGE_BASE_WHEN_LOADED
* SYMBOL    _shift      4 =    RANDOM 1 31 1
* PATCH     _array_            FUNCTION chksm.obj
# PATCH     _base              FUNCTION chksm.obj
* PATCH     _key               FUNCTION chksm.obj
* PATCH     _shift             FUNCTION chksm.obj
# SYMBOL    _cksum      4 =    FUNCTION chksm.obj OF _key _array_
                                 _base _shift_
* SYMBOL    _array      4 =    clientList
* SYMBOL    _anybb      4 =    ANY_BB_ADDRESS
* SYMBOL    _fixups     4 =    FIXUPBASE
* PATCH     _anybb             TEMPLATE
* PATCH     _array             TEMPLATE
# PATCH     _cksum             TEMPLATE
* PATCH     _key               TEMPLATE
* PATCH     _shift             TEMPLATE
* PATCH     _fixups            TEMPLATE
* PATCH     _fixup1            TEMPLATE
* PATCH     _fixup2            TEMPLATE
* PATCH     _fixup3            TEMPLATE
```

To enable the guard key computations, the symbol "IMAGE_BASE_WHEN_LOADED" is now defined. This symbol points to the beginning address of the host software program image, which is then used to locate the contents of the host software program image. The instruction "SYMBOL _base 4=IMAGE_BASE_WHEN_LOADED" defines the symbol "_base," which points to the beginning address of the loaded host software program image.

The instruction "PATCH _base FUNCTION chksm.obj" parameterizes the "chksm.obj" module. Recall that the chksm.obj module has an internal label "_base" that is now patched by guard processing engine 45 with the value of symbol "_base."

The instruction "SYMBOL _cksum 4=FUNCTION chksm.obj OF _key _array_ _shift" executes the "chksm.obj" function, and returns the value of the guard key which is saved as the 32-bit symbol "_cksum". Note that the "_array_" symbol points to a table of RVAs of the client range. This table is different from the actual client range table ("_array") of the injected guard, but they both have the same representation format. The "_key" symbol and "_shift" symbol are used for customizing the checksum algorithm used in the function. The chksm.obj function computes the absolute addresses of the client code to checksum by adding the RVAs in the table pointed to by the "_array_" symbol to the base address of the host software program image (identified by the symbol "_base"). The resulting addresses are then used to access the portions of the host software program image in computer memory that need to be checksummed. Upon completion, the chksm.obj function returns the result. In an embodiment, it actually returns the address of the resulting bytes, and the guard configuration file hides the operation that dereferences the resulting bytes.

Finally, the guard processing engine 45 executes the instruction "PATCH _cksum TEMPLATE" which patches the value of the symbol "_chksm" into the guard.

The following guard configuration file pseudocode example injects a repair guard. The pseudocode commands designated by "*" are executed by guard processing engine 45 on the first pass, while the pseudocode commands designated by "#" are skipped.

```
* TEMPLATE  guard.obj              CLIENT clientRVA clientLen :
                                     _maskedcopy 216
# SYMBOL    _begin_       4 =      IMAGE_BASE_
                                     LOADED + clientRVA
* SYMBOL    length        4 =      clientLen
# PATCH     _begin_                FUNCTION chksm.obj
* PATCH     _length_               FUNCTION chksm.obj
# SYMBOL    _maskedcopy  216 =     FUNCTION chksm.obj OF _begin_
                                     _length_
* SYMBOL    _begin        4 =      OPTIONAL_ HEADER_
                                     IMAGEBASE + clientRVA
* SYMBOL    _length       4 =      clientLen
* PATCH     _begin                 TEMPLATE
* PATCH     _length                TEMPLATE
# PATCH     _maskedcopy            TEMPLATE
```

The "TEMPLATE" instruction indicates the guard template file to inject (guard.obj). Guard processing engine 45 creates a copy of the guard template code in computer memory, and injects the copy into the host software program. The "TEMPLATE" instruction further declares the following to guard processing engine 45:

The guard is intended to protect a client range "CLIENT" assigned by guard processing engine 45. Because a repair guard is a single range guard, the client range is specified by the symbols "clientRVA" and "clientLen."

The guard has a key. The key is found within the range beginning with the label "_maskedcopy," and is 216 bytes long.

The instruction "SYMBOL _length_ 4=clientLen" defines a new symbol called "_length_," which is assigned the value of clientLen (the byte length of the client range).

The instruction "PATCH _length_FUNCTION chksm.obj" parameterizes an external object code function called "chksm.obj". This function is first loaded into guard processing engine 45. The chksm.obj function has internal label "_length_" that is patched by guard processing engine 45 with the values of symbol "_length_" that was previously assigned by execution of the SYMBOL command.

The instruction "SYMBOL _begin 4=OPTIONAL_HEADER_IMAGEBASE+client RVA" defines a new symbol called "_begin." The symbol "OPTIONAL_HEADER_IMAGEBASE" contains the base address as shown in the optional header of the host software program. The symbol "_begin" is assigned the value of OPTIONAL_HEADER_IMAGEBASE incremented by the address stored in clientRVA.

The instruction "SYMBOL _length 4=clientLen" defines a new symbol called "_length" which is assigned the value of the byte length of the client range.

The "PATCH _begin TEMPLATE" and "PATCH _length TEMPLATE" instructions patch the values of the respective symbols into the guard template.

To compute the key of a repair guard, in this embodiment of the present invention, guard processing engine 45 executes the guard configuration file again, but this time executes the instructions that were previously skipped. The key of a repair guard stores a disguised copy of the client code of the guard. Upon execution of the repair guard, this key will be used to restore the desired contents of client code.

Before executing the guard configuration file a second time, guard processing engine 45 loads the host software program into computer memory as if the software program were about to be executed by the computer. This step creates a run-time image of the software program from which the guard key is to be derived. This run-time image is saved to a temporary file that will be deleted as soon as execution of the guard configuration file finishes.

Referring back to the guard configuration file pseudocode provided above, on the second pass the pseudocode commands designated by "#" are executed by guard processing engine 45, while the pseudocode commands designated by "*" are skipped:

```
* TEMPLATE  guard.obj              CLIENT clientRVA clientLen :
                                   _maskedcopy 216
# SYMBOL    _begin_     4 =        IMAGE_BASE_WHEN_
                                   LOADED + clientRVA
* SYMBOL    _length_    4 =        clientLen
# PATCH     _begin_                FUNCTION chksm.obj
* PATCH     _length_               FUNCTION chksm.obj
# SYMBOL    _maskedcopy 216 =      FUNCTION chksm.obj OF _begin_
                                   _length_
* SYMBOL    _begin      4 =        OPTIONAL_HEADER_
                                   IMAGEBASE + clientRVA
* SYMBOL    _length     4 =        clientLen
* PATCH     _begin                 TEMPLATE
* PATCH     _length                TEMPLATE
# PATCH     _maskedcopy            TEMPLATE
```

The process of creating this key is similar to that of computing a checksum key. The instruction "SYMBOL begin_ 4=IMAGE_BASE_WHEN_LOADED+clientRVA" defines the symbol "_begin_" and assigns it the value of the beginning address of the client range (IMAGE_BASE_WHEN_LOADED incremented by clientRVA).

The instruction "PATCH _begin_FUNCTION chksm.obj" parameterizes the chlsum.obj function with the value of "_begin_."

The instruction "SYMBOL _maskedcopy 216=FUNCTION chksm.obj OF begin_ _length" defines the symbol "_maskedcopy" and assigns it the value returned by the execution of the function chksm.obj using "_begin_" and "_length_" as function parameters. The symbol "_masked-copy" is the guard key, which is 216 bytes long. In an embodiment, it actually returns the address of the resulting bytes, and the guard configuration file hides the operation that dereferences the resulting bytes.

Finally, the guard processing engine 45 executes the instruction "PATCH _maskedcopy TEMPLATE" which patches the symbol "_maskedcopy" into the guard.

In an embodiment, a guard injection computer program according to the present invention utilizes a distributed structure such as a dynamic link library ("DLL") structure or shared object structure. DLLs and shared objects enable a computer program to be broken up into sub-components that are combined at runtime to form a complete computer program. An advantage of this approach is the ability to change a component's functionality without affecting the remainder of the computer program, as long as component's interface with the computer program remains constant. An additional advantage is that a library aware computer program can manage a group of component libraries with identical interfaces, invoking a library from the group based on the services that it provides. In addition, DLLs and shared objects provide a means for independent computer program components to communicate or interoperate at runtime.

Figure 9:
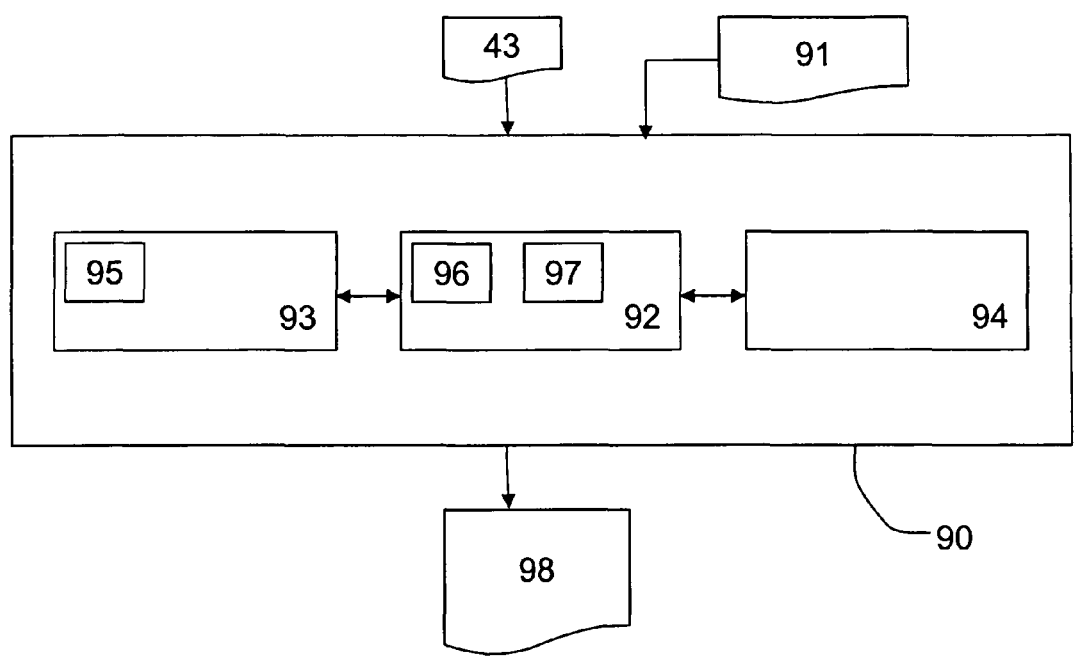
FIG. 9 shows a schematic block diagram of a guard injection computer program according to an embodiment of the present invention.

FIG. 9 shows a schematic block diagram of a guard injection computer program according to an embodiment of the present invention. As shown in FIG. 9, guard injection computer program 90 of this embodiment comprises guard processing engine 92, guard manager 93, and configuration file 94. The inputs to guard injection computer program 90 according to this embodiment are guard script 43 (which, in this embodiment, is in an XML format) and host software program 91. The output of guard injection computer program 90 according to this embodiment is protected host software program 98.

A practitioner can write an XML-based guard script in an XML editor or an ordinary text editor. In an embodiment, guard injection computer program according to an embodiment of the present invention comprises a GUI that automates creation of an XML-based guard script. A practitioner does not need to know XML or the rules enforced by the guard injection computer program's XML schema. A practitioner simply marks the host software program in the GUI, chooses certain options, and enters data in dialog boxes. The guard injection computer program according to an embodiment of the present invention automatically validates the XML-based guard script. In this embodiment, if a guard script is prepared with an XML editor or text editor, it should be validated against the guard script schema before using the guard script to build a protected host software program.

Guard processing engine 92 comprises guard script interpreter 96 and document object model parser 97. Guard script interpreter 96 is operable to interpret guard script 43. Guard script 43 comprises computer instructions that, when executed by the guard injection computer program of the present invention, enable the guard injection computer program to inject guards into a host software program. According to this embodiment, guard script interpreter 96 parses guard script 43 and builds a document object model ("DOM") therefrom. In an embodiment, document object model parser 97 is operable to traverse a DOM generated by guard script interpreter 96, and invoke the appropriate handlers for each DOM node. The handlers are functions and routines of guard processing engine 92 and guard manager 93. Invocation of such handlers causes, for example, the injection of guards into the host software program, the obfuscation of host software program code, the injection of comments into the host software program code, the computation of guard keys, and the finalization of guards in the software program.

Guard processing engine 92 is operable to invoke guard manager 93. A guard injection computer program of this embodiment of the present invention comprises a guard manager 93 corresponding to each guard type available for injection into the host software program. For purposes of clarity, only one guard manager is shown in FIG. 9. However, it is within the scope of the present invention that a guard injection computer program of the present invention may have two or more guard managers. Each guard manager comprises a plurality of computer files and computer instructions that, when executed, cause one or more guards of the guard manager's guard type to be injected into the host software program.

Each guard manager 93 comprises at least one guard library 95. For purposes of clarity, only one guard library is shown in FIG. 9. However, it is within the scope of the present invention that a guard injection computer program of the present invention may have two or more guard libraries. Each guard library 95 comprises a plurality of computer files containing data and information about the guard manager's guard type that are available for injection into the host software program. Guard library 95 comprises a plurality of guard templates comprising the guard computer instructions that will be injected into the host software program. Depending on the guard type, certain guard parameters such as, for example, the client range(s) and the guard key may not be specified in the guard template. Guard manager 93 is operable to interact with guard library 95 to retrieve data and information about the guards that are to be injected in the host software program, and then is operable to process such data and information to inject the guards into the host software program. In an embodiment, a guard injection computer program of the present invention comprises an obfuscation guard manager. The obfuscation guard manager comprises an obfuscation guard library, which contains computer files and computer instructions that, when invoked, implement one or more host software program obfuscation techniques.

Configuration file 94 comprises, optionally, a plurality of computer files and computer instructions that, when executed, affect the operation of the guard injection computer program of the present invention. Configuration file 94 can be used to, for example, to control the availability of certain obfuscation techniques within the guard injection computer program, and to specify a level of detail for certain user outputs generated by the guard injection computer program.

According to the embodiment of a guard injection computer program shown in FIG. 9, the responsibility for injecting guards into the host software program is delegated to the guard manager rather than the guard processing engine. Control flow is initiated with the guard processing engine, but the guard processing engine in this embodiment serves primarily to invoke the guard managers as directed by the guard script and DOM. Each guard manager is deployed as a DLL or shared object. Accordingly, a guard manager or guard library can be changed without affecting other guard managers, guard libraries, or the guard processing engine. In addition, the guard managers implemented as DLLs or shared objects can communicate and interoperate at runtime, such as to coordinate guard key computations when injecting a network of guards. Guard managers utilize shared symbol tables to coordinate guard key computations when injecting a network of guards.

Figure 10:
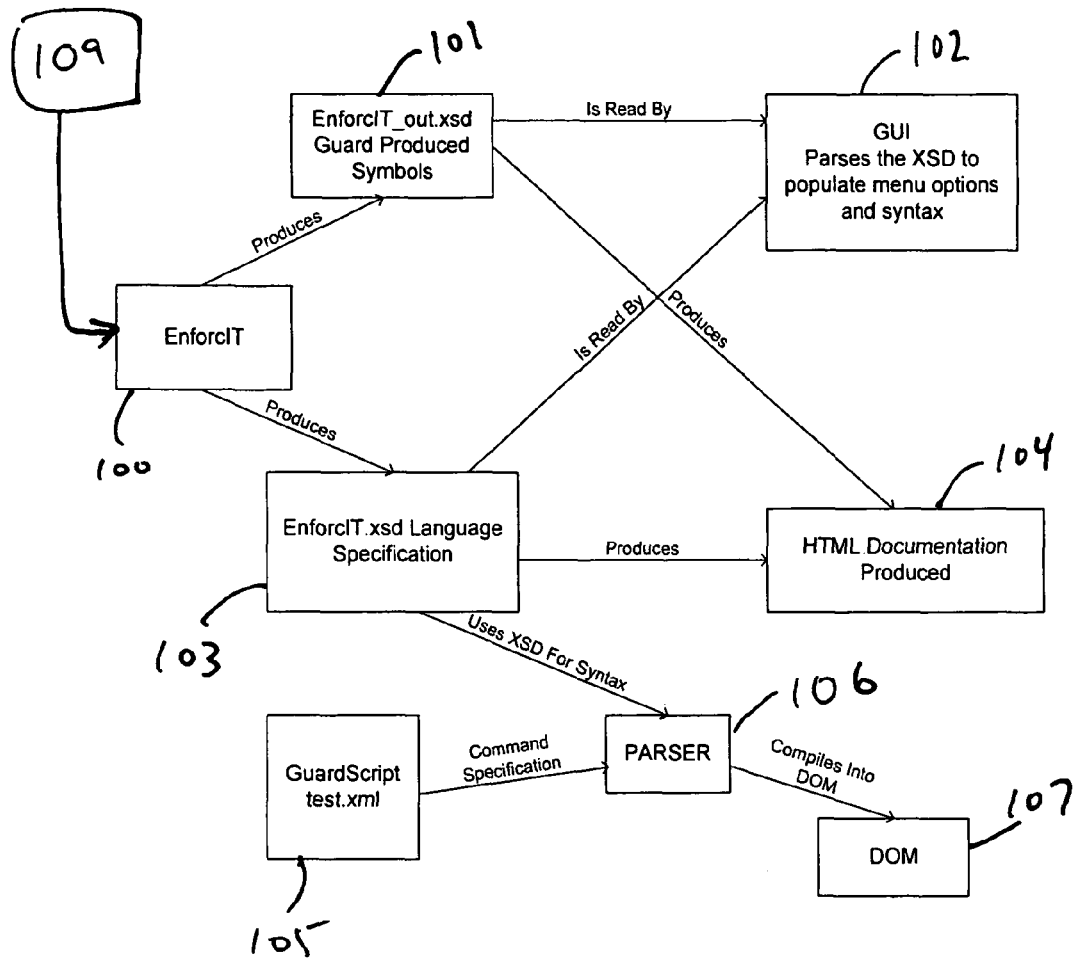
FIG. 10 shows a schematic block diagram of menu and documentation generation feature of a guard injection computer program according to the present invention.

Referring now to FIG. 10, there is shown a schematic block diagram illustrating the ability of a guard injection computer program according to an embodiment of the present invention to create a menu structure and documentation for itself. The menu structure and documentation may be made available through an implementation of guard injection computer program comprising a GUI. The menu structure and documentation also may be made available within a software development tool such as Microsoft Visual Studio that comprises a GUI.

As shown in FIG. 10, at least one guard library 109 is analyzed by guard injection computer program 100. Guard injection computer program 100 produces two XML schema files. Each file is in an XSD format. Each file comprises information from the at least one guard library 109 and the guard injection computer program 100. The first XML schema file, shown as block 101 in FIG. 10, comprises guard symbols representative of the available guards in the guard library 109. The second XML schema file, shown as block 103 in FIG. 10, comprises a guard script language specification. This file comprises information from the at least one guard library 109 and the guard injection computer program 100.

The XML schema files shown as block 101 and block 103 are configured to be used to populate menus and instantiate syntax that can be available to a user of a GUI-based software tool desiring to insert guards into a host software program. The XML schema files shown as block 101 and block 103 also are configured to provided HTML-based documentation of the various guards and guard script commands that are available to a user of the GUI-based software tool. These actions are shown as blocks 102 and 104 of FIG. 10, respectively.

As shown in block 106 of FIG. 10, the XML schema file shown as block 103 in FIG. 10 also is utilized by a guard script interpreter to validate the syntax of an incoming XML-based guard script, shown as block 105. Because the XML schema file shown as block 103 is created dynamically, it contains the most current guard script schema. Accordingly, syntax of the XML-based guard script shown as block 105 is validated against an up-to-date schema. This step eliminates many syntax errors before the guard injection process begins. If the syntax of the XML-based guard script shown as block 105 is valid, the guard script interpreter creates a DOM from the guard script, as discussed elsewhere herein. It is noted that, as long as the guard libraries and guard engine remain constant, XML schema files shown as block 101 and block 103 remain valid. There ordinarily is not a need to regenerate these files each time a host software program is protected according to the present invention.

In an embodiment of the present invention, a symbol can be either of the following:
- a global, 32-bit (or greater) integer variable referred to in the host software program; such a variable may be specified as a range.
- a guard symbol, i.e., a variable defined by a guard. The guard_name and guard_symbol_name elements may be used specify such a symbol as a range.

A symbol is required by an embodiment of a silent guard. The symbol element is used to specify a variable whose value is verified against an expected value by the silent guard. When the silent guard is invoked, the current value of the symbol is compared with the expected value, using the comparison parameter of the silent guard to specify the variable containing the expected value. A symbol in this embodiment must be a non-static, global variable.

A symbol according to an embodiment of the present invention may be specified as a range and, optionally, an index into the range. The symbol range must be a contiguous range of read-only or writable data of at least 32 bits. If the index parameter is used, the symbol must be at least 32 bits after the index value. If the symbol is a host software program variable, it must appear in the map file associated with the host software program. Consequently, it must be a non-static variable that is not only defined in, but also referred to in the host software program. The string that used to specify the symbol must uniquely identify an integer variable in the host software program.

The following are pseudocode examples of XML-based guard scripts. In the following pseudocode example, the name of the global variable appears in the host software program map file as ?svg@@3IA. The example first defines that variable as a range named "r1." It then specifies a silent guard "g1" that compares the named range to the integer 32.

```
<range_cmd name="r1">
    <include>
        <range>
            <code>?svg@@3IA</code>
        </range>
    </include>
</range_cmd>
<guard_cmd name="g1">
    <silent>
        <comparison>
            <compared_integer>
                <value>32</value>
            </compared_integer>
        </comparison>
        <invocation>
        ...
        </invocation>
        <symbol>
            <range>
                <range_name>r1</range_name>
            </range>
        </symbol>
    </silent>
</guard_cmd>
```

The following pseudocode example inserts a checksum guard named g2 into an image named I.

```
<image_cmd name="I">
    ...
    <guard_cmd name="g2">
        <checksum>
        ...
        </checksum>
    </guard_cmd>
</image_cmd>
```

The following pseudocode example creates repair guard g1, which places copies of the instructions corresponding to the main function and the foo function into guard code at protection time. At runtime, because there are three instances of the guard, both functions are restored there times.

```
<guard_cmd name="g1">
    <repair>
        <protected_range>
            <include>
                <range><code>main</code></range>
                <range><code>foo</code></range>
            </include>
        </protected_range>
        <invocation>
            <rangeSet><include>
                <range><image_name>I<image_name></range>
```

```
            </include></rangeSet>
        </invocation>
        <instances>3</instances>
    </repair>
</guard_cmd>
```

In the following pseudocode example, the antidebug guard named g102 consists of 50 instances, each of which will be invoked with a probability of 85%. Because the algorithm parameter is set to user, each instance that is invoked will fire if the program is executing in a user-level debugger at the time the instance is invoked.

```
<guard_cmd name="g102">
    <antidebug>
        ...
        <algorithm>
            <use>user</use>
        </algorthm>
        <instances>50</instances>
        <randomization>.85</randomization>
    </antidebug>
</guard_cmd>
```

In the following pseudocode example, a checksum guard named check1 and then an obfuscation guard named obf1 both protect the main function. The checksum guard check1 is obfuscated by guard obf2.

```
<guard_cmd name="check1">
    <checksum>
        <protected_range>
            <include><range><code>main</code></range></include>
        </protected_range>
    </checksum>
</guard_cmd>
<guard_cmd name="ob1">
    <obfuscation>
        <protected_range>
            <include><range><code>main</code></range></include>
        </protected_range>
    </obfuscation>
</guard_cmd>
<guard_cmd name="obf2">
    <obfuscation>
        <protected_range>
            <include>
                <range><guard_name>check1</guard_name></range>
            </include>
        </protected_range>
    </obfuscation>
</guard_cmd>
```

In the following example, a silent guard named g1 stores an internal form of the value 0x78563412 and an operation involving the global variable named pin. When the guard is invoked, the current value of pin will be compared with 0x78563412.

```
<guard_cmd name="g1">
    <silent>
        <comparison>
            <compared_integer>
                <value>5672</value>
            </compared_integer>
        </comparison>
```

```
            <invocation>
              ...
            </invocation>
            <symbol>
              <range>
                <code>pin</code>
              </range>
            </symbol>
          </silent>
        </guard_cmd>
```

When an XML-based guard script is parsed, the symbols are included in the DOM. The symbols then are resolved in the guard finalization phase. According to an embodiment of the present invention, a guard injection process comprises three phases:

1. Guard schema definition. In this phase, the rules, grammar, an syntax of guards and a guard script language are defined.

2-Guard script parsing. In this phase, a guard script is parsed. Its syntax is checked against the schema, a DOM is created from the guard script, the DOM is traversed, and a list of object commands is built from the DOM.

3-Object command execution. All object commands are "run." In an embodiment comprising a guard processing engine and one or more guard managers, a command that makes no reference to a guard is executed by the guard processing engine. A command to inject a guard results in a call to the appropriate guard manager for that guard type. All information (including any symbol) is passed to the guard manager. During guard finalization, all symbols and references are properly resolved.

In an embodiment, the present invention comprises a system and method for automated guard script generation. A practitioner of this embodiment of the present invention provides certain information to the system of the present invention, and, in response, the system generates the guard script automatically through the use of artificial intelligence. The system of the present invention then can automatically execute the guard script, causing guards to be injected into the host software program.

According to this embodiment of the present invention, there are two phases to automatically build a protected host software program: an information gathering phase and a protection phase.

In the information gathering phase, the present invention queries a practitioner about the host software program. Information about the host software program is collected from the practitioner through the use of a computerized query-response process. Information such as the best location(s) to guard a host software program, any threats to a host software program that need to be anticipated by the guarding scheme, what size and performance losses are appropriate for a host software program, etc., may be collected according to the needs of a practitioner in a particular implementation of this embodiment.

Figure 11:
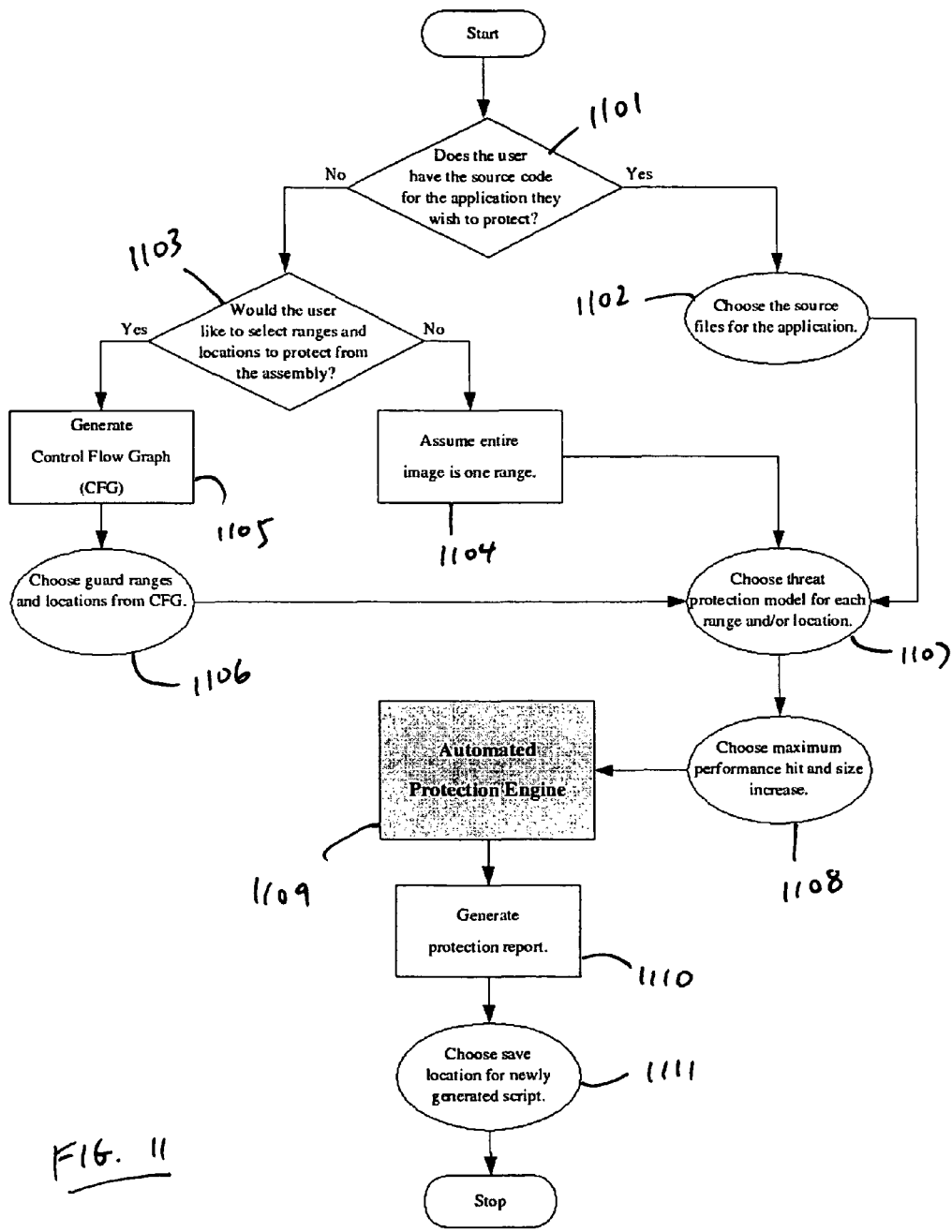
FIG. 11 shows a flow chart illustrating an embodiment of the information-gathering phase according to the present invention.

Shown in FIG. 11 is a flow chart illustrating one embodiment of the information-gathering phase according to an embodiment of the present invention. In the step shown as block 1101, a determination is made as to whether the host software program to be protected is in source code form or binary form. If a source code version is to be protected, flow proceeds to the step shown as block 1102. In this step, ranges and locations are identified in the source code as discussed herein.

If a binary code version is to be protected, in the step shown as block 1103 it is determined if the practitioner desires to identify ranges and locations within the binary code version. If not, flow proceeds to the step shown as block 1104, where it is assumed that the entire host software program image is a single range.

However, it is anticipated that some practitioners may have an in depth understanding of machine code and be able to identify ranges and locations within the binary code version of the host software program. In this case, flow proceeds to the step shown as block 1105, where a control flow graph ("CFG") of the host software program is constructed, which a practitioner can use to select ranges and locations for protection. This step is shown as block 1106. Data protection, like host software program flow protection, would be valuable to many applications. With this in mind, a data flow graph ("DFG") could be constructed to compliment the CFG and allow a practitioner to apply certain "data only" protections to the binary (e.g., encryption, pre/post-damage, data-obfuscation, etc.). Data sections would be automatically identified and secured based on the practitioner's choices.

In the event ranges and locations are not identified by the practitioner, the present invention is able to automatically identify such ranges and locations. For example, the present invention may assume a basic block size of one instruction, assume that the entire image is one large range, and the choose injection points for the chosen protection(s).

In the step shown as block 1107 of FIG. 11, a threat protection model is defined. Threats might include, for example, reverse engineering for algorithm extraction, code-injection, static and/or dynamic analysis, etc. The practitioner need not know what threats to guard against, as the present invention can be configured to assume a scenario where all threats are imminent. In this case, each threat would be protected against equally well. However, a threat model specific to a host software program will always be helpful in applying the strongest defense possible. With a threat model specific to a host software program, the practitioner can modify the ratio of importance for certain threats. For example, the practitioner could place 55% importance on the threat of reverse-engineering, and 45% importance on the threat of code-lifting, thereby leaving all other threats with an importance of 0%. Threat models could be applicable to specific ranges or to the entire host software program, depending on the practitioner's preference.

In the step shown as block 1108, the practitioner defines size and performance limitations for the protected host software program. Such limitations constrain the present invention, which otherwise may inject guards without regard to performance or size of the host software program. In an embodiment of the present invention, performance limitations could be placed on either the entire application or certain ranges, allowing for a greater control over protections injected into the host software program.

In the step shown as block 1109, the host software program and the other information are provided to an automated protection engine. An automated protection engine according to the present invention is outfitted with artificial intelligence techniques. In an embodiment, two main artificial intelligence techniques are used: frame-based expert systems and genetic algorithms.

Figure 12:
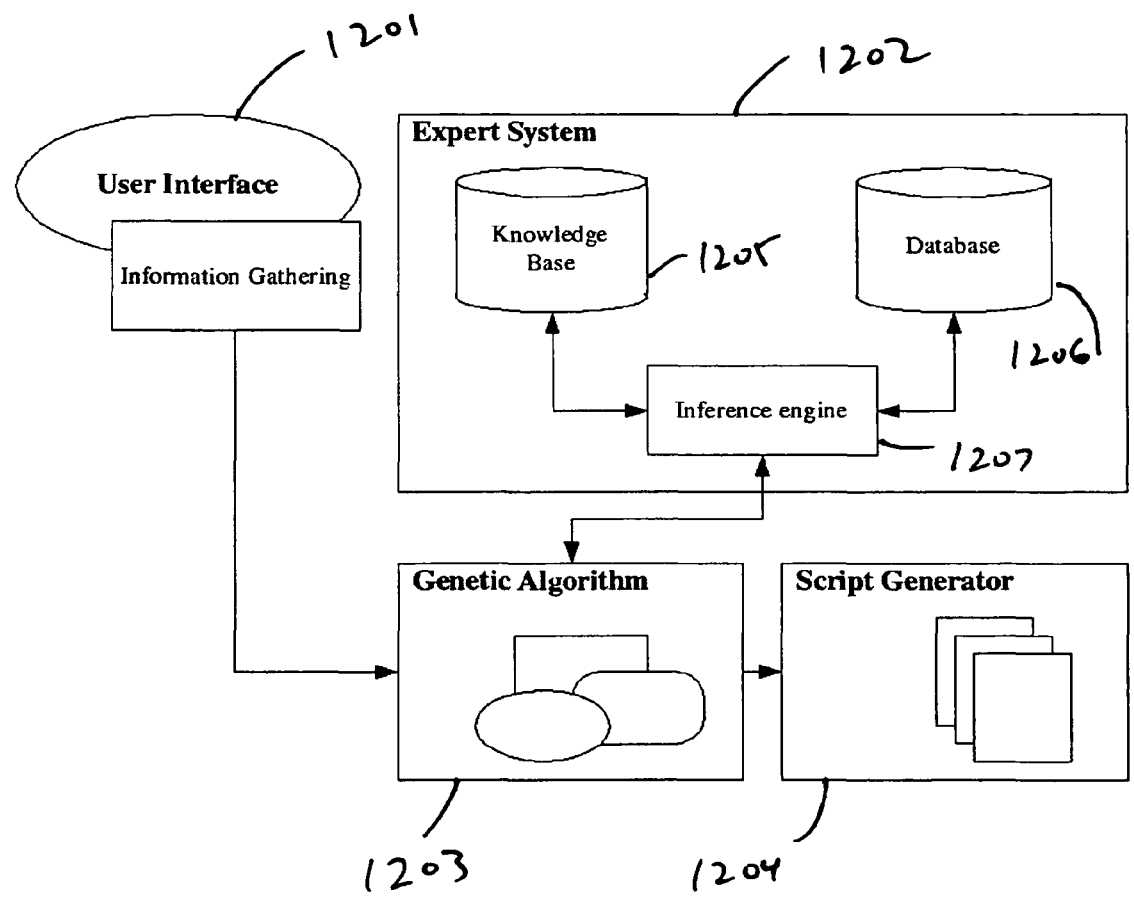
FIG. 12 shows a schematic block diagram of an automated protection engine according to an embodiment of the present invention.

FIG. 12 shows a schematic block diagram of an automated protection engine according to an embodiment of the present invention. Shown in FIG. 12 are user interface 1201, expert system 1202, genetic algorithm system 1203, and script generator 1204. User interface 1201 can be a graphical user interface, command line interface, or another form of interface known in the art and adapted to receive the threat information, size and performance constraints, and other information about the host software program.

Expert system 1202 comprises knowledge base 1205, database 1206, and inference engine 1207. Expert system 1202 is a frame-based expert system comprising expertise in the field of software security. Software security expertise is stored in knowledge base 1205. In an embodiment, knowledge base 1205 comprises a set of IF-THEN rules containing information on different guard types, encryption schemes, obfuscation levels, etc. Each such rule, contained in a data structure within the knowledge base, has knowledge of each protection's effectiveness against certain threats.

Database 1206 comprises information supporting any rules contained in the knowledge base 1205. For example, if knowledge base 1205 reports that a repair guard is 100% effective against reverse-engineering, this fact will be stored in database 1206 so knowledge base 1205 can recall it later. Knowledge base 1205 also contains various protection topologies and guard networks that have been proven effective.

Inference engine 1207, when invoked, queries knowledge base 1205 for a set of rules that coincides with both a set of data passed to it, and any information in database 1206. Inference engine 1207 then returns an answer that relates: the rules in knowledge base 1205, the facts in the database 1206, any information passed to inference engine 1207 when it was invoked, and any information gathered during the information gathering process.

Figure 13:
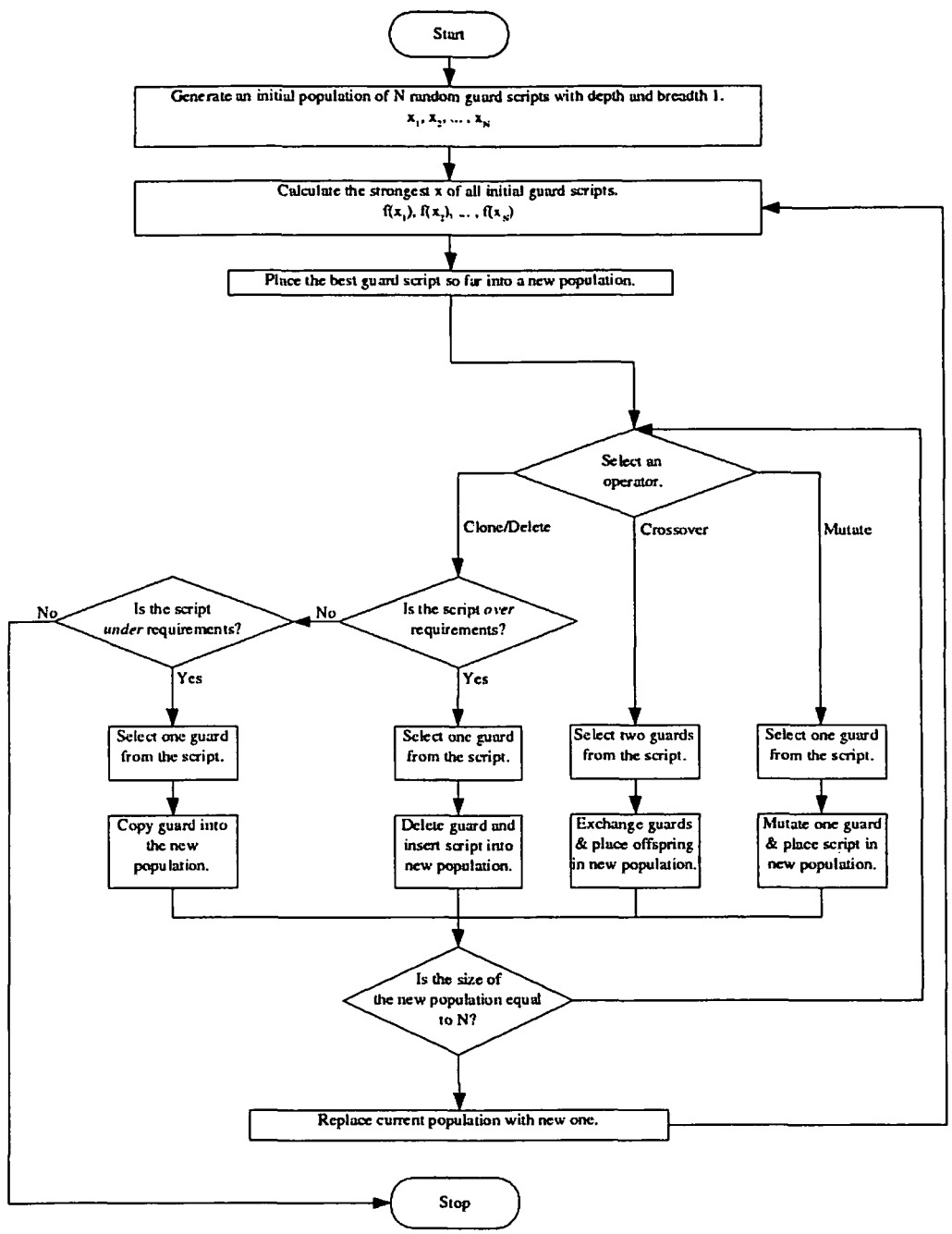
FIG. 13 shows a flow chart illustrating the operation of an embodiment of a genetic algorithm system according to the present invention.

According to the present invention, genetic algorithm system 1203 generate a population of solutions to the problem of automatically creating a guard script. In an embodiment, genetic algorithm system 1203 will randomly create n possible solutions to a given host software program protection problem. Each solution will be tested for validity and strength. The strongest valid solution will be mutated, cloned, and otherwise changed randomly (n−1) times to create a new set of n solutions. By repeating this process, each generation of solutions becomes stronger, and eventually an optimal solution is the outcome. FIG. 13 shows a flow chart illustrating the operation of an embodiment of genetic algorithm system 1203 according to the present invention.

Referring back to FIG. 12, script generator 1204 is operable to write a guard script based on the output of genetic algorithm system 1203. Referring back to FIG. 11, the operations of script generator 1204 are shown as blocks 1110 and 1111.

According to the present invention, guards may be injected into host software programs written in a high level programming language such as C, C++, Pascal, or Fortran, or those written in the assembly language of any computer hardware architecture known in the art, or those written in binary executable form or object code form. Assembly language code compiled from code written in one of the high-level software programming languages well known in the art, such as, for example, code written in C, C++, Pascal, or Fortran, or compiled Java bytecode, may be used as host software program code. Assembly language code from other sources may be used as the host software program code, provided the assembly language code is an assembly language code that does not base its computations on fixed absolute addresses. Generally, binary executable code or object code may be used as host software program code provided the binary executable code or the object code does not base its computations on fixed absolute addresses. Even if the binary executable code or the object code bases its computations on fixed absolute addresses, the binary executable code or the object code still may be used as host software program code if the binary executable code or the object code is converted to a form in which the dependence on the use of fixed absolute addresses is eliminated. The vast majority of commercial software development results in assembly language code which can serve as host software program code for the present invention.

In an embodiment, the present invention is adaptable to produce executable computer programs comprising embedded guards that are able to operate on a variety of platforms, where a "platform" comprises a particular operating system/processor combination.

In an embodiment, a guard injection computer program is adaptable to be used on a variety of platforms. In order to support multiple platforms, the architecture of a guard injection computer program according to an embodiment of the present invention must be adaptable. Program functionality is divided between a front end layer that comprises functionality that is common across all platforms, and a back end layer that is specific to a particular platform.

Those of skill in the art will appreciate that the various functions of a guard injection compute program according the present invention may be performed by computer software and/or computer hardware. Such computer software may be written in a high-level programming language such as, for example, Java, C, C++, Pascal, or Fortran.

In the discussion of the commands and arguments contained herein, certain commands and arguments are shown in uppercase letters, certain commands and arguments are shown in lowercase letters, and certain commands and arguments are shown in a mix of uppercase and lowercase letters. It will be understood that such formatting is used herein merely for the benefit of the reader, and that such formatting does not imply that any command or argument is necessarily case sensitive.

While this invention has been described as having an exemplary structure, the present invention can be further modified within the scope and spirit of this disclosure. This application is therefore intended to cover any variations, uses, or adaptations of the invention using its general principles. For example, the methods disclosed herein and in the appended claims represent one possible sequence of performing the steps thereof. A practitioner of the present invention may determine in a particular implementation of the present invention that multiple steps of one or more of the disclosed methods may be combinable, or that a different sequence of steps may be employed to accomplish the same results. Each such implementation falls within the scope of the present invention as disclosed herein and in the appended claims. Furthermore, this application is intended to cover such departures from the present disclosure as come within known or customary practice in the art to which this invention pertains.

We claim:

1. A system for automating the installation of one or more self-protecting software security mechanisms into a previously developed software program, the system comprising:
   a computer having a memory;
   a first software program resident in said memory, said first software program having a predetermined functionality;
   a second software program resident in said memory, said second software program configured to automatically inject at least one guard into said first software program without disrupting said predetermined functionality, said at least one guard comprising guard instructions to cause said first software program to self-protect by executing improperly when said first software program detects tampering with said first software program; and a third software program resident in said memory, said third software program comprising program instructions, wherein said second software program automatically injects said at least one guard into said first software program in response to said program instructions of said third software program.

2. The system of claim 1, wherein said second software program generates an executable version of said first software program having said at least one guard injected therein, such that said guard instructions are executed by running said executable version of said first software program.

3. The system of claim 1, wherein at least one of said at least one guards is configured, upon detection of unauthorized modification of said first software program, to take at least one defensive action during execution of an executable version of said first software program.

4. The system of claim 1, wherein said second software program is operable to iteratively apply at least one code obfuscation technique to said first software program until a predetermined level of code obfuscation is achieved.

5. A method for increasing the tamper resistance of a host software program having a predetermined functionality through the use of at least one guard, wherein said at least one guard comprises guard instructions configured to deter tampering with said host software program, the method comprising the steps of:
    defining a guard schema, said guard schema comprising a syntax for a guard script language, said guard script language comprising a plurality of guard script commands;
    defining a guard script, said guard script comprising a self-protection scheme desired for said host software program, said guard script comprising at least one guard script command of said guard script language;
    automatically building a document object model from said guard script using a guard script interpreter; said guard script interpreter running on a computer having a processor; and
    automatically traversing said document object model using a document object model parser to build a list of commands that when executed cause the injection of said guard instructions into said host software program without disrupting said predetermined functionality of said host software program, said guard instructions causing said host software program to execute improperly when said host software program detects tampering, said document object model parser running on said computer.

6. The method of claim 5, wherein the step of defining a guard script comprises the steps of:
    inserting markers into a source code version of said host software program, said markers being arranged within said host software program according to said protection scheme desired for said host software program; and
    utilizing said markers in defining said guard script, the definition of said guard script being accomplished in a manner consistent with said guard schema.

7. The method of claim 5, wherein the step of automatically building a document object model using a guard script interpreter comprises the steps of:
    reading said guard script; and
    parsing said guard script for consistency with said guard schema.

8. The method of claim 5, wherein said document object model comprises one or more nodes, and wherein the step of automatically traversing said document object model using a document object model parser comprises the steps of:
    detecting at least one of said one or more nodes of said document object model; and
    building a list of commands representative of said detected at least one of said one or more nodes.

9. A method for increasing the tamper resistance of a host software program having a predetermined functionality through the use of at least one guard, wherein said at least one guard comprises guard instructions configured to deter tampering with said host software program, the method comprising the steps of:
    inserting markers into said host software program, said markers being arranged within said host software program according to a protection scheme to make said host software program self-protecting;
    defining a threat model for said host software program, said threat model defining the relative importance of defending against various threats to said host software program;
    defining constraints on size and performance of said host software program; and
    injecting guard instructions into said host software program in accordance with said markers, said threat model, and said constraints using a guard injection program running on a computer without disrupting said predetermined functionality, said guard instructions causing said host software program to execute improperly when said host software program detects tampering.

10. The method of claim 9, wherein the step of injecting guard instructions into said host software program comprises the steps of:
    defining a guard script, said guard script being defined automatically through analysis of said markers, said threat model, and said constraints;
    building a document object model using said guard script; and
    traversing said document object model to build a list of commands that when executed cause the injection of said guard instructions into said host software program.

11. A method for updating a guard injection computer program, said guard injection computer program configured to automatically inject one or more guards into a host software program having a predetermined functionality in response to one or more guarding commands received by said guard injection computer program, the method comprising the steps of:
    reading a guard library, said guard library comprising computer files and computer instructions related to said one or more guards, said one or more guards being configured to deter tampering with said host software program without disrupting said predetermined functionality of said host software program by causing said host software program to execute improperly when said host software program detects tampering with said host software program;
    deriving a guard schema from said guard library, said guard schema comprising syntactical requirements for said guarding commands; and
    deriving documentation for said one or more guards from said guard library.

12. The method of claim 11, wherein said guard schema is in an XML schema definition format.

13. The method of claim 11, further comprising the steps of:
    deriving guard symbols from said guard library, said guard symbols being useable by said guard injection computer program in carrying out said guarding commands; and populating a graphical user interface of said guard injection computer program with functionality that is consistent with said guard schema.

14. The method of claim 13, wherein said guard symbols are in XML schema definition format.

15. A method for adding a guard injection computer program to a tool for software program development, said guard injection computer program configured to automatically inject one or more guards into a host software program having a predetermined functionality in response to one or more guarding commands received by said guard injection computer program, said host software program being developed using said tool, the method comprising the steps of:
- reading a guard library, said guard library comprising computer files and computer instructions related to said one or more guards, said one or more guards being configured to deter tampering with said host software program without disrupting said predetermined functionality of said host software program by causing said host software program to execute improperly when said host software program detects tampering with said host software program;
- deriving a guard schema from said guard library, said guard schema comprising syntactical requirements for said guarding commands; and
- deriving documentation for said one or more guards from said guard library, said documentation being accessible through said tool.

16. The method of claim 15, wherein said tool for software program development is Microsoft Visual Studio.

17. A computer system for increasing the tamper resistance of a host software program having a predetermined functionality, the computer system comprising:
- computer circuitry configured to define a guard schema, said guard schema comprising a syntax for a guard script language, said guard script language comprising a plurality of guard script commands;
- computer circuitry configured to define a guard script, said guard script comprising a protection scheme desired for a host software program, said guard script comprising at least one guard script command of said guard script language;
- computer circuitry configured to automatically build a document object model using said guard script and said guard schema; and
- computer circuitry configured to automatically traverse said document object model to build a list of commands that when executed cause the injection of guard instructions into said host software program without disrupting said predetermined functionality of said host software program, wherein said injected guard instructions cause said host software program to execute improperly when said host software program detects tampering with said host software program.

18. A computer system for increasing the tamper resistance of a host software program having a predetermined functionality, the computer system comprising:
- computer circuitry configured to insert markers into a host software program, said markers being arranged within said host software program according to a protection scheme desired for said host software program;
- computer circuitry configured to define a threat model that defines the relative importance of defending against various threats to said host software program;
- computer circuitry configured to define constraints on size and performance of said host software program; and
- computer circuitry configured to inject guard instructions into said host software program without disrupting said predetermined functionality in accordance with said markers, said threat model, and said constraints, wherein said injected guard instructions cause said host software program to execute improperly when said host software program detects tampering.

19. A computer system for updating a guard injection computer program, said guard injection computer program configured to automatically inject one or more guards into a host software program having a predetermined functionality in response to one or more guarding commands received by said guard injection computer program, said computer system comprising:
- computer circuitry configured to read a guard library, said guard library comprising computer files and computer instructions related to said one or more guards, said one or more guards configured to deter tampering with said host software program into which said one or more guards is installed without disrupting said predetermined functionality of said host software program by causing said host software program to execute improperly when said host software program detects tampering with said host software program;
- computer circuitry configured to derive a guard schema from said guard library, said guard schema comprising syntactical requirements for said guarding commands; and
- computer circuitry configured to derive documentation for at least one of said one or more guards from said guard library.

20. The computer system of claim 19, further comprising:
a tool for software program development.

21. A system for automating the installation of one or more software security mechanisms into a previously developed software program, the system comprising:
- a computer having a memory;
- a first software program resident in said memory, said first software program having a predetermined functionality;
- a second software program resident in said memory, said second software program configured to automatically inject at least one guard into said first software program without disrupting said predetermined functionality to generate a protected version of said first software program, said at least one guard comprising guard instructions to cause said protected version of said first software program to execute improperly when said protected version of said first software program detects tampering; and
- a third software program resident in said memory, said third software program comprising program instructions, wherein said second software program automatically injects said at least one guard into said first software program in response to said program instructions of said third software program;
- wherein said protected version of said first software program is configured to execute improperly when tampering is detected regardless of whether said second software program or said third software program is operational.

* * * * *